US009043347B2

(12) United States Patent
LeTourneau

(10) Patent No.: US 9,043,347 B2
(45) Date of Patent: *May 26, 2015

(54) METHOD AND/OR SYSTEM FOR MANIPULATING TREE EXPRESSIONS

(71) Applicant: Robert T. and Virginia T. Jenkins as Trustees for the Jenkins Family Trust Dated Feb. 8, 2002, Sacramento, CA (US)

(72) Inventor: Jack J. LeTourneau, Santa Barbara, CA (US)

(73) Assignee: Robert T. and Virginia T. Jenkins, Sacramento, CA (US), as Trutees for the Jenkins Family Trust Dated Feb. 8, 2002

( * ) Notice: Subject to any disclaimer, the term of this patent is extended or adjusted under 35 U.S.C. 154(b) by 0 days.

This patent is subject to a terminal disclaimer.

(21) Appl. No.: 14/086,837

(22) Filed: Nov. 21, 2013

(65) Prior Publication Data

US 2014/0289279 A1 Sep. 25, 2014

Related U.S. Application Data

(63) Continuation of application No. 12/578,411, filed on Oct. 13, 2009, now Pat. No. 8,626,777, which is a continuation of application No. 11/006,841, filed on Dec. 7, 2004, now Pat. No. 7,627,591.

(60) Provisional application No. 60/623,280, filed on Oct. 29, 2004.

(51) Int. Cl.
*G06F 17/30* (2006.01)
*G06F 7/00* (2006.01)

(52) U.S. Cl.
CPC .... *G06F 17/30961* (2013.01); *G06F 17/30327* (2013.01); *G06F 17/30292* (2013.01); *Y10S 707/99942* (2013.01)

(58) Field of Classification Search
USPC .................................................. 707/101, 756
See application file for complete search history.

(56) References Cited

U.S. PATENT DOCUMENTS

| | | | |
|---|---|---|---|
| 3,201,701 A | 8/1965 | Maitra | |
| 4,001,951 A * | 1/1977 | Fasse | 434/267 |
| 4,134,218 A * | 1/1979 | Adams et al. | 434/267 |
| 4,156,910 A | 5/1979 | Barton et al. | |
| 4,439,162 A * | 3/1984 | Blaine | 434/268 |
| 4,677,550 A | 6/1987 | Ferguson | |
| 4,737,109 A * | 4/1988 | Abramson | 434/267 |
| 4,745,561 A | 5/1988 | Hirosawa et al. | |
| 4,751,684 A | 6/1988 | Holt | |
| 4,831,525 A | 5/1989 | Saito et al. | |
| 4,867,686 A * | 9/1989 | Goldstein | 434/267 |
| 5,905,138 A | 5/1990 | Bourne | |
| 4,931,928 A | 6/1990 | Greenfeld | |
| 4,949,388 A | 8/1990 | Bhaskaran | |
| 4,989,132 A | 1/1991 | Mellender et al. | |

(Continued)

OTHER PUBLICATIONS

U.S. Appl. No. 13/229,624: Response and Amendments after Final, filed Jan. 30, 2015, 11 pages.

(Continued)

*Primary Examiner* — Kuen Lu
(74) *Attorney, Agent, or Firm* — Berkeley Law & Technology Group, LLP

(57) ABSTRACT

Embodiments of methods and/or systems of manipulating tree expressions are disclosed.

26 Claims, 17 Drawing Sheets

(56) References Cited

U.S. PATENT DOCUMENTS

| | | | |
|---|---|---|---|
| 4,991,087 A | 2/1991 | Burkowski et al. |
| 5,021,943 A | 6/1991 | Grimes |
| 5,021,992 A | 6/1991 | Kondo |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,598,350 A | 1/1997 | Kawanishi et al. |
| 5,606,669 A | 2/1997 | Bertin et al. |
| 5,687,362 A | 11/1997 | Bhargava et al. |
| 5,724,512 A | 3/1998 | Winterbottom |
| 5,724,576 A | 3/1998 | Letourneau |
| 5,758,152 A | 5/1998 | LeTourneau |
| 5,781,906 A | 7/1998 | Aggarwal et al. |
| 5,787,415 A | 7/1998 | Jacobson et al. |
| 5,787,432 A | 7/1998 | LeTourneau |
| 5,796,356 A | 8/1998 | Okada et al. |
| 5,802,370 A | 9/1998 | Sitbon et al. |
| 5,822,593 A | 10/1998 | Lamping et al. |
| 5,848,159 A | 12/1998 | Collins et al. |
| 5,930,805 A | 7/1999 | Marquis |
| 5,970,490 A | 10/1999 | Morgenstern |
| 5,978,790 A | 11/1999 | Buneman et al. |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,055,537 A | 4/2000 | LeTourneau |
| 6,088,691 A | 7/2000 | Bhargava et al. |
| 6,141,655 A | 10/2000 | Johnson et al. |
| 6,199,103 B1 | 3/2001 | Sakaguchi et al. |
| 6,236,410 B1 | 5/2001 | Politis et al. |
| 6,243,859 B1 | 6/2001 | Chen-Kuang |
| 6,289,354 B1 | 9/2001 | Aggarwal et al. |
| 6,292,938 B1 | 9/2001 | Sarkar et al. |
| 6,336,812 B1 * | 1/2002 | Cooper et al. ............... 434/267 |
| 6,341,372 B1 | 1/2002 | Datig |
| 6,442,584 B1 | 8/2002 | Kolli et al. |
| 6,446,256 B1 | 9/2002 | Hymen et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,611,844 B1 | 8/2003 | Saulpaugh et al. |
| 6,658,649 B1 | 12/2003 | Bates et al. |
| 6,714,939 B2 | 3/2004 | Saldanha et al. |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 * | 11/2004 | Charbonneau ............... 434/273 |
| 6,847,979 B2 | 1/2005 | Allemang et al. |
| 6,854,976 B1 * | 2/2005 | Suhr ............................ 434/273 |
| 6,874,005 B2 | 3/2005 | Fortenberry et al. |
| 6,965,990 B2 | 11/2005 | Barsness et al. |
| 6,968,330 B2 | 11/2005 | Edwards et al. |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,191,182 B2 | 3/2007 | Anonsen et al. |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 * | 9/2008 | Sarvazyan et al. ............ 434/273 |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,544,062 B1 * | 6/2009 | Hauschild et al. ............ 434/267 |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 * | 8/2009 | Palakodeti ..................... 434/267 |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,779,396 B2 | 8/2010 | Meijer et al. |
| 7,801,923 B2 | 9/2010 | LeTourneau |
| 7,882,147 B2 | 2/2011 | LeTourneau |
| 7,890,928 B2 | 2/2011 | Patrudu |
| 7,899,821 B1 | 3/2011 | Schiffmann |
| 8,032,860 B2 | 10/2011 | Piehler et al. |
| 8,037,102 B2 | 10/2011 | Letourneau |
| 8,060,868 B2 | 11/2011 | Meijer et al. |
| 8,250,526 B2 | 8/2012 | Anderson et al. |
| 8,316,059 B1 | 11/2012 | Schiffmann et al. |
| 8,356,040 B2 | 1/2013 | LeTourneau |
| 8,443,339 B2 | 5/2013 | LeTourneau |
| 8,626,777 B2 | 1/2014 | LeTourneau |
| 8,650,201 B2 | 2/2014 | Letourneau |
| 8,683,431 B2 | 3/2014 | Thomson et al. |
| 2001/0003211 A1 | 6/2001 | Bera |
| 2002/0040292 A1 | 4/2002 | Marcu |
| 2002/0059281 A1 | 5/2002 | Watanabe et al. |
| 2002/0062259 A1 | 5/2002 | Katz et al. |
| 2002/0107860 A1 | 8/2002 | Gobeille et al. |
| 2002/0129129 A1 | 9/2002 | Bloch et al. |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2003/0041088 A1 | 2/2003 | Wilson et al. |
| 2003/0065659 A1 | 4/2003 | Agarwal et al. |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0024790 A1 | 2/2004 | Everett |
| 2004/0044659 A1 | 3/2004 | Judd et al. |
| 2004/0060007 A1 | 3/2004 | Gottlob et al. |
| 2004/0068498 A1 | 4/2004 | Patchet et al. |
| 2004/0103105 A1 | 5/2004 | Lindblad et al. |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0268236 A1 | 12/2004 | Chidlovskii et al. |
| 2005/0021548 A1 | 1/2005 | Bohannon et al. |
| 2005/0023524 A1 | 2/2005 | Beatty |
| 2005/0027743 A1 | 2/2005 | O'Neil et al. |
| 2005/0050016 A1 | 3/2005 | Stanoi et al. |
| 2005/0050066 A1 | 3/2005 | Hughes |

(56) References Cited

U.S. PATENT DOCUMENTS

| | | | |
|---|---|---|---|
| 2005/0058976 | A1 | 3/2005 | Vernon |
| 2005/0060332 | A1 | 3/2005 | Bernstein et al. |
| 2005/0065964 | A1 | 3/2005 | Ziemann et al. |
| 2005/0125432 | A1 | 6/2005 | Lin et al. |
| 2005/0138073 | A1 | 6/2005 | Zhou et al. |
| 2005/0154265 | A1 | 7/2005 | Miro et al. |
| 2005/0154979 | A1 | 7/2005 | Chidlovskii et al. |
| 2005/0165732 | A1 | 7/2005 | Burges |
| 2005/0187900 | A1 | 8/2005 | LeTourneau |
| 2005/0214727 | A1* | 9/2005 | Stoianovici et al. .......... 434/262 |
| 2005/0267908 | A1 | 12/2005 | LeTourneau |
| 2006/0004817 | A1 | 1/2006 | Andrews |
| 2006/0005122 | A1 | 1/2006 | Lemoine |
| 2006/0015538 | A1 | 1/2006 | LeTourneau |
| 2006/0053122 | A1 | 3/2006 | Korn et al. |
| 2006/0074838 | A1 | 4/2006 | Srivastava |
| 2006/0095442 | A1 | 5/2006 | LeTourneau |
| 2006/0095455 | A1 | 5/2006 | LeTourneau |
| 2006/0123029 | A1 | 6/2006 | LeTourneau |
| 2006/0129582 | A1 | 6/2006 | Schiffmann et al. |
| 2006/0209351 | A1 | 9/2006 | Saito |
| 2006/0259533 | A1 | 11/2006 | LeTourneau |
| 2006/0271573 | A1 | 11/2006 | LeTourneau |
| 2007/0003917 | A1* | 1/2007 | Kitching et al. .............. 434/272 |
| 2007/0198538 | A1 | 8/2007 | Palacios |
| 2010/0094908 | A1 | 4/2010 | LeTourneau |
| 2010/0114969 | A1 | 5/2010 | LeTourneau |
| 2010/0191775 | A1 | 7/2010 | Schiffmann et al. |
| 2010/0205581 | A1 | 8/2010 | LeTourneau |

OTHER PUBLICATIONS

U.S. Appl. No. 14/086,808: Issue Fee Payment and Rule 312 amendment, filed Feb. 17, 2015, 1 page.
U.S. Appl. No. 14/625,473: Application as filed on Feb. 18, 2015, 92 pages.
U.S. Appl. No. 13/625,812: Notice of Allowance and Fees, mailed Dec. 9, 2014, 20 pages.
U.S. Appl. No. 13/632,581: Non-Final Rejection, mailed Jan. 27, 2015, 16 pages.
U.S. Appl. No. 14/149,749: Notice of Publication, mailed Dec. 11, 2014, 1 page.
U.S. Appl. No. 14/596,154: Application as filed Jan. 13. 2015, 60 pages.
U.S. Appl. No. 8 14/596,154: Filing Receipt, mailed Jan. 27, 2015, 3 pages.
U.S. Appl. No. 14/596,154: Notice to File Missing Parts, mailed Jan. 27, 2015, 3 pages.
U.S. Appl. No. 13/860,482: Issue Fee Payment and Rule 312 Amendments, filed Feb. 4, 2015, 4 pages.
U.S. Appl. No. 11/412,417, filed Apr. 26, 2006, Schiffmann.
U.S. Appl. No. 11/480,094, filed Apr. 26, 2006, LeTourneau, J.J.
U.S. Appl. No. 12/627,816, filed Nov. 30, 2009, Schiffmann.
U.S. Appl. No. 12/702,243, filed Feb. 8, 2010, LeTourneau, J.J.
U.S. Appl. No. 12/830,236, filed Jul. 2, 2010, LeTourneau, J.J.
"Core Technology Benchmarks A White Paper", Jul. 2002, downloaded from the internet Mar. 2, 2004.
"Origin Data, Inc. White Paper", ©1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003 12.
Cano et al., "Lazy Evaluation in Penniless Propagation over Join Trees", Networks, vol. 39(4), 2002 Wiley Periodicals, Inc., 175-185, 2002.
Cooper et al., "Oh! Pascal!", 1982, W.W. Norton & Company, Inc., Chapter 12, Arrays for Random Access, pp. 295-327.
ER, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Nos. For Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Reiss, "Semantics-Based Code Search", IEEE ICSE, pp. 243-253, 2009.
Sechrest et al., "Blending Hierarchical and Attribute-Based File Naming", Distributed Computing System, 1992, Proceedings of the 12th International Conference on 9-12 Jun. 1992, Page(s): 572-580.
Shanmugasundaram et al., "Querying SML Views of Relational Data", Proceedings of the 27th VLDB Conference, Roma, Italy, 2001, 9 pages.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.

(56) References Cited

OTHER PUBLICATIONS

Smorynski, Craig, "Logical Number Theory I: An Introduction", Springer-Verlag Berlin Heidelberg, ©1991, Arithmetic Encoding, The Cantor Pairing Function, pp. 14-23, and 305.
Sproat et al., "Compilation of Weighted Finite-State Tranducers from Decision Trees" ACM, pp. 215-222, 1996.
Somani et al., "Phased-Mission System Analysis Using Boolean Algebraic Methods", May 1994, ACM Press, vol. 22, Issue 1.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wu, "A Prime No. Labeling Scheme for Dynamic Ordered XML Trees", IEEE, 2004, 13 pages.
Zaks, S., "Lexicographic Generation of Ordered Trees", Dept. of Computer Science, University of Illinois, the Journal of Theoretical Computer Science, vol. 10(1), pp. 63-82, Revised 1978.
Dubiner, M., Galil, Z., and Magen, E. "Faster Tree Pattern Matching.", Journal of the Association for Computing Machinery, vol. 41, No. 2, Mar. 1994, pp. 205-213.
Ramesh, R. And Ramakrishnan, I.V., "Nonlinear Pattern Matching in Trees." Journal of the Association for Computer Machinery, vol. 39, No. 2. Apr. 1992, pp. 295-316.
Durango Bill's Enumeration of Trees. http://web.archive.org/web/20021028184112/http://www.durangobill.com/Trees. html, 1998.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, P. 1-10, Jan. 2, 1999, Baltimore, Maryland, United States.
U.S. Appl. No. 11/005,859: Application filed Dec. 6, 2004, 120 pages.
U.S. Appl. No. 11/005,859: Notice to File Missing parts mailed Jan. 10, 2005, 2 pages.
U.S. Appl. No. 11/005,859: Response to Notice to File Missing parts mailed Apr. 1, 2005, 9 pages.
U.S. Appl. No. 11/005,859: Preliminary Amendment filed Apr. 28, 2005, 193 pages.
U.S. Appl. No. 11/005,859: Office Action—Restriction Requirement mailed Dec. 12, 2007, 7 pages.
U.S. Appl. No. 11/005,859: Response to Office Action—Restriction Requirement filed Jan. 14, 2008, 82 pages.
U.S. Appl. No. 11/005,859: Non-final Office Action mailed Mar. 21, 2008, 10 pages.
U.S. Appl. No. 11/005,859: Amendment filed Jul. 21, 2008, 86 pages.
U.S. Appl. No. 11/005,859: Final Office Action mailed Oct. 30, 2008, 14 pages.
U.S. Appl. No. 11/005,859: Amendment filed Dec. 30, 2008, 83 pages.
U.S. Appl. No. 11/005,859: Advisory Action mailed Jan. 13, 2009, 4 pages.
U.S. Appl. No. 11/005,859: RCE with amendment filed Apr. 30, 2009, 86 pages.
U.S. Appl. No. 11/005,859: Final Office Action mailed Jul. 8, 2009, 9 pages.
U.S. Appl. No. 11/005,859: Examiner Interview Summary received Oct. 27, 2009, 3 pages.
U.S. Appl. No. 11/005,859: Amendment filed Dec. 8, 2009, 83 pages.
U.S. Appl. No. 11/005,859: Advisory Action mailed Dec. 22, 2009, 3 pages.
U.S. Appl. No. 11/005,859: RCE with Amendment filed Jan. 7, 2010, 85 pages.
U.S. Appl. No. 11/005,859: Non-Final Office Action mailed Jan. 21, 2010, 8 pages.
U.S. Appl. No. 11/005,859: Response to Non-Final Office Action filed Feb. 25, 2010, 83 pages.
U.S. Appl. No. 11/005,859: Final Office Action mailed Jun. 8, 2010, 9 pages.
U.S. Appl. No. 11/005,859: Office Action Response mailed Sep. 1, 2010, 89 pages.
U.S. Appl. No. 11/005,859: Advisory Action mailed Sep. 14, 2010, 3 pages.
U.S. Appl. No. 11/005,859: Notice of Appeal mailed Sep. 29, 2010, 1 page.
U.S. Appl. No. 11/005,859: Office Action mailed Oct. 15, 2010, 5 pages.
U.S. Appl. No. 11/005,859: Office Action Response mailed Jan. 18, 2011, 95 pages.
U.S. Appl. No. 11/005,859: Final Office Action mailed Mar. 30, 2011, 7 pages.
U.S. Appl. No. 11/005,859: Notice of Allowance and Fees Due, mailed Jun. 9, 2011, 11 pages.
U.S. Appl. No. 11/005,8591: Amendment after Notice of Allowance and Issue Fee Payment, mailed Sep. 9, 2011, 2 pages.
U.S. Appl. No. 11/005,859: Issue Notification, mailed Sep. 21, 2011, 1 page.
U.S. Appl. No. 13/229,624: Application as filed on Sep. 9, 2011, 139 pages.
U.S. Appl. No. 13/229,624: Filing receipt, mailed Sep. 21, 2011, 4 pages.
U.S. Appl. No. 13/229,624: Non-Final Office Action, mailed Nov. 23, 2011, 8 pages.
U.S. Appl. No. 13/229,624: Notice of Publication, mailed Dec. 30, 2011, 1 page.
U.S. Appl. No. 13/229,624: Amendment, mailed Feb. 23, 2012, 22 pages.
U.S. Appl. No. 13/229,624: Final Office Action, mailed Mar. 20, 2012, 10 pages.
U.S. Appl. No. 13/229,624: Amendment after final, mailed Jun. 20, 2012, 4 pages.
U.S. Appl. No. 13/229,624: Advisory Action, mailed Jun. 20, 2012, 4 pages.
U.S. Appl. No. 13/229,624: RCE, mailed Jul. 20, 2012, 26 pages.
U.S. Appl. No. 13/229,624: Non-Final Rejection, mailed Oct. 2, 2013, 9 pages.
U.S. Appl. No. 13/229,624: Response to non-final office action, mailed Dec. 27, 2013, 11 pages.
U.S. Appl. No. 13/229,624: Non-Final Office Action, Mailed Apr. 4, 2014, 5 Pages.
U.S. Appl. No. 13/229,624: Non-Final Office Action Response, Mailed Aug. 1, 2014, 9 Pages.
U.S. Appl. No. 13/229,624: Final Rejection. Mailed Oct. 30, 2014, 6 pages.
U.S. Appl. No. 11/007,139: Application filed Dec. 7, 2004, 90 pages.
U.S. Appl. No. 11/007,139: Notice to File Missing Parts mailed Jan. 19, 2005, 2 pages.
U.S. Appl. No. 11/007,139: Response to Notice to File Missing Parts mailed Apr. 1, 2005, 9 pages.
U.S. Appl. No. 11/007,139: Preliminary Amendment filed Apr. 28, 2005, 146 pages.
U.S. Appl. No. 11/007,139: Non-final Office Action mailed May 14, 2007, 58 pages.
U.S. Appl. No. 11/007,139: Amendment filed Oct. 15, 2007, 32 pages.
U.S. Appl. No. 11/007,139: Supplemental Response filed Oct. 17, 2007, 7 pages.
U.S. Appl. No. 11/007,139: Non-final Office Action mailed Jan. 2, 2008 with Examiner's search results, 21 pages.
U.S. Appl. No. 11/007,139: Amendment filed Apr. 2, 2008, 30 pages.
U.S. Appl. No. 11/007,139: Final Office Action mailed Aug. 15, 2008, 30 pages.
U.S. Appl. No. 11/007,139: Amendment filed Oct. 15, 2008, 26 pages.
U.S. Appl. No. 11/007,139: Advisory Action mailed Oct. 22, 2008, 26 pages.
U.S. Appl. No. 11/007,139: RCE with Amendment filed Nov. 14, 2008, 32 pages.

(56) References Cited

OTHER PUBLICATIONS

U.S. Appl. No. 11/007,139: Non-final Office Action mailed Dec. 8, 2008, 24 pages.
U.S. Appl. No. 11/007,139: Amendment filed May 8, 2009, 31 pages.
U.S. Appl. No. 11/007,139: Final Office Action mailed Aug. 4, 2009, 26 pages.
U.S. Appl. No. 11/007,139: Amendment filed Dec. 4, 2009, 28 pages.
U.S. Appl. No. 11/007,139: Advisory Action mailed Dec. 14, 2009, 4 pages.
U.S. Appl. No. 11/007,139: RCE with amendment filed Jan. 4, 2010, 27 pages.
U.S. Appl. No. 11/007,139: Non-Final Office Action mailed Jan. 27, 2010, 31 pages.
U.S. Appl. No. 11/007,139: Response to Non-Final Office Action filed Apr. 27, 2010, 30 pages.
U.S. Appl. No. 11/007,139: Office Action mailed Jul. 20, 2010, 20 pages.
U.S. Appl. No. 11/007,139: Office Action response mailed Oct. 20, 2010, 33 pages.
U.S. Appl. No. 11/007,139: Advisory Action mailed Oct. 25, 2010, 2 pages.
U.S. Appl. No. 11/007,139: Office Action response mailed Nov. 18, 2010, 24 pages.
U.S. Appl. No. 11/007,139: Advisory Action mailed Dec. 1, 2010, 4 pages.
U.S. Appl. No. 11/007,139: Office Action response and Notice of Appeal mailed Dec. 20, 2010, 29 pages.
U.S. Appl. No. 11/007,139: Office Action mailed Jan. 3, 2011, 24 pages.
U.S. Appl. No. 11/007,139: Office Action response, mailed May 3, 2011, 27 pages.
U.S. Appl. No. 11/007,139: Final Office Action, mailed Jul. 18, 2011, 23 pages.
U.S. Appl. No. 11/007,139: Amendment after final mailed Oct. 18, 2011, 30 pages.
U.S. Appl. No. 11/007,139: Advisory Action and rule 312 amendment, mailed Nov. 4, 2011, 4 pages.
U.S. Appl. No. 11/007,139: Notice of Appeal filed Nov. 16, 2011, 1 page.
U.S. Appl. No. 11/007,139: Appeal Brief filed May 1, 2012, 93 pages.
U.S. Appl. No. 11/007,139: Notice of defective appeal brief, mailed May 7, 2012, 3 pages.
U.S. Appl. No. 11/007,139: Appeal Brief filed May 15, 2012, 9 pages.
U.S. Appl. No. 11/007,139: Examiner's answer to appeal brief, mailed Aug. 20, 2012, 35 pages.
U.S. Appl. No. 11/007,139: Reply Brief, mailed Oct. 22, 2012, 29 pages.
U.S. Appl. No. 11/007,139: Appeal Docketing Notice, mailed Nov. 6, 2012, 2 pages.
U.S. Appl. No. 11/006,320: Application filed Dec. 6, 2004, 75 pages.
U.S. Appl. No. 11/006,320: Response to Missing Parts and Preliminary Amendment filed May 9, 2005, 135 pages.
U.S. Appl. No. 11/006,320: Office Action—Restriction Requirement mailed Mar. 26, 2007, 7 pages.
U.S. Appl. No. 11/006,320: Response to Restriction Requirement filed Apr. 27, 2007, 34 pages.
U.S. Appl. No. 11/006,320: Notice of Non-Compliant Amendment mailed Jul. 6, 2007, 3 pages.
U.S. Appl. No. 11/006,320: Response to Non-Compliant Amendment filed Jul. 25, 2007, 33 pages.
U.S. Appl. No. 11/006,320: Non-final Office Action mailed Oct. 1, 2007, 24 pages.
U.S. Appl. No. 11/006,320: Amendment filed Jan. 29, 2008, 45 pages.
U.S. Appl. No. 11/006,320: Notice of Non-Compliant Amendment mailed Apr. 8, 2008, 4 pages.
U.S. Appl. No. 11/006,320: Amendment filed May 5, 2008, 44 pages.
U.S. Appl. No. 11/006,320: Non-final Office Action mailed Aug. 15, 2008, 33 pages.
U.S. Appl. No. 11/006,320: Amendment filed Nov. 14, 2008, 40 pages.
U.S. Appl. No. 11/006,320: Office Action — Shortened Statutory Period mailed Jan. 27, 2009, 2 pages.
U.S. Appl. No. 11/006,320: Amendment filed Apr. 27, 2009, 44 pages.
U.S. Appl. No. 11/006,320: Final Office Action mailed Jul. 29, 2009, 13 pages.
U.S. Appl. No. 11/006,320: Amendment filed Nov. 30, 2009, 10 pages.
U.S. Appl. No. 11/006,320: Non-final Office Action mailed Dec. 4, 2009, 25 pages.
U.S. Appl. No. 11/006,320: Response to Non-Final Office Action filed Feb. 23, 2010, 11 pages.
U.S. Appl. No. 11/006,320: Final Office Action mailed May 24, 2010, 11 pages.
U.S. Appl. No. 11/006,320: Office Action response mailed Aug. 24, 2010, 15 pages.
U.S. Appl. No. 11/006,320: Notice of Allowance mailed Sep. 17, 2010, 8 pages.
U.S. Appl. No. 11/006,320: Examiner Interview Summary and supplemental Notice of Allowance mailed Dec. 17, 2010, 9 pages.
U.S. Appl. No. 11/006,320: Rule 312 Amendment and Issue Fee payment mailed Dec. 17, 2010, 10 pages.
U.S. Appl. No. 11/006,320: Issue Notification mailed Jan. 12, 2011, 1 page.
U.S. Appl. No. 15/972,326: Filing receipt and Notice to File Missing Parts mailed Jan. 6, 2011, 5 pages.
U.S. Appl. No. 12/972,326: Filing receipt and Notice to File Missing Parts mailed Jan. 6, 2011, 5 pages.
U.S. Appl. No. 12/972,326: Response to Notice to File Missing parts mailed Jan. 26, 2011, 14 pages.
U.S. Appl. No. 12/972,326: Filing Receipt, mailed Feb. 18, 2011, 3 pages.
U.S. Appl. No. 12/972,326: Preliminary amendment mailed May 20, 2011, 15 pages.
U.S. Appl. No. 12/972,326: Notice of publication and non-compliant amendment mailed Jun. 2, 2011, 3 pages.
U.S. Appl. No. 12/972,326: Preliminary amendment mailed Jul. 5, 2011, 21 pages.
U.S. Appl. No. 12/972,326: Notice of additional fee due, mailed Jul. 12, 2011, 2 pages.
U.S. Appl. No. 12/972,326: Preliminary Amendment mailed Aug. 10, 2011, 7 pages.
U.S. Appl. No. 12/972,326: Non-Final Office Action, mailed Feb. 23, 2012, 9 pages.
U.S. Appl. No. 12/972,326: Abandonment, mailed Sep. 18, 2012, 2 pages.
U.S. Appl. No. 13/014,677: Application as filed on Jan. 26, 2011, 90 pages.
U.S. Appl. No. 13/014,677: Notice to file missing parts and filing receipt, mailed Mar. 23, 2011, 5 pages.
U.S. Appl. No. 13/014,677: Notice of Abandonment mailed Nov. 29, 2011, 2 pages.
U.S. Appl. No. 11/006,848: Application as filed Dec. 7, 2004, 59 pages.
U.S. Appl. No. 11/006,848: Notice to File Missing Parts mailed Mar. 18, 2005, 2 pages.
U.S. Appl. No. 11/006,848: Response to Notice to File Missing Parts mailed May 3, 2005, 101 pages.
U.S. Appl. No. 11/006,848: Non-Final Office Action mailed Apr. 4, 2007, 11 pages.
U.S. Appl. No. 11/006,848: Response to Non-Final Office Action mailed Oct. 3, 2007, 20 pages.
U.S. Appl. No. 11/006,848: Supplemental Amendment mailed Nov. 13, 2007, 4 pages.
U.S. Appl. No. 11/006,848: Non-Final Office Action mailed Feb. 5, 2008, 16 pages.
U.S. Appl. No. 11/006,848: Response to Non-Final Office Action filed Aug. 4, 2008, 27 pages.
U.S. Appl. No. 11/006,848: Final Office Action mailed Dec. 2, 2008, 30 pages.
U.S. Appl. No. 11/006,848: RCE filed May 4, 2009, 24 pages.

(56) References Cited

OTHER PUBLICATIONS

U.S. Appl. No. 11/006,848: Notice of Allowance mailed Jun. 11, 2009, 8 pages.
U.S. Appl. No. 11/006,848: Issue fee mailed Sep. 11, 2009, 10 pages.
U.S. Appl. No. 11/006,848: Issue Notification mailed Oct. 28, 2009, 1 page.
U.S. Appl. No. 12/573,829: Application as filed on Oct. 5, 2009, 64 pages.
U.S. Appl. No. 12/573,829: Notice to File Missing Parts and Filing Receipt mailed Oct. 20, 2009, 5 pages.
U.S. Appl. No. 12/573,829: Preliminary Amendment mailed Dec. 21, 2009, 17 pages.
U.S. Appl. No. 12/573,829: Filing receipt mailed Jan. 4, 2010, 5 pages.
U.S. Appl. No. 12/573,829: Notice of Publication mailed Apr. 15, 2010, 1 page.
U.S. Appl. No. 12/573,829: Office Action mailed Jun. 28, 2010, 35 pages.
U.S. Appl. No. 12/573,829: Office Action Response mailed Sep. 28, 2010, 22 pages.
U.S. Appl. No. 12/573,829: Office Action mailed Nov. 1, 2010, 29 pages.
U.S. Appl. No. 12/573,829: Office Action Response mailed Jan. 3, 2011, 29 pages.
U.S. Appl. No. 12/573,829: Advisory Action mailed Jan. 7, 2011, 3 pages.
U.S. Appl. No. 12/573,829: Notice of Appeal mailed Jan. 11, 2011, 1 page.
U.S. Appl. No. 12/573,829: Appeal Brief, mailed May 4, 2011, 68 pages.
U.S. Appl. No. 12/573,829: Examiner's Answer to Appeal Brief, mailed Jul. 21, 2011, 31 pages.
U.S. Appl. No. 12/573,829: Reply brief filed Sep. 21, 2011, 17 pages.
U.S. Appl. No. 12/573,829: Reply brief noted Oct. 5, 2011, 2 pages.
U.S. Appl. No. 12/573,829: Appeal Docketing notice Oct. 11, 2011, 2 pages.
U.S. Appl. No. 12/573,829: Appeal Board Decision, mailed May 9, 2014, 10 pages.
U.S. Appl. No. 12/573,829: Request for continued examination, mailed Jul. 9, 2014, 19 pages.
U.S. Appl. No. 11/006,841: Application as filed on Dec. 7, 2004, 63 pages.
U.S. Appl. No. 11/006,841: Notice to file missing parts mailed Jan. 10, 2005, 2 pages.
U.S. Appl. No. 11/006,841: Response to Notice to file missing parts and preliminary amendment mailed Apr. 14, 2005, 105 pages.
U.S. Appl. No. 11/006,841: Non-Final OA mailed Apr. 6, 2007, 16 pages.
U.S. Appl. No. 11/006,841: Response to Non-Final OA mailed Sep. 6, 2007, 63 pages.
U.S. Appl. No.11/006,841: Restriction Requirement mailed Nov. 27, 2007, 5 pages.
U.S. Appl. No. 11/006,841: Restriction Requirement response mailed Dec. 27, 2007, 36 pages.
U.S. Appl. No. 11/006,841: Restriction Requirement mailed Mar. 17, 2008, 9 pages.
U.S. Appl. No. 11/006,841: Response to Restriction Requirement mailed Jul. 17, 2008, 33 pages.
U.S. Appl. No. 11/006,841: Final Office Action mailed Oct. 29, 2008, 54 pages.
U.S. Appl. No. 11/006,841: Response to Final Office Action mailed 12/29/08, 45 pages.
U.S. Appl. No. 11/006,841: Advisory Action mailed Jan. 6, 2009, 3 pages.
U.S. Appl. No. 11/006,841: RCE mailed Apr. 23, 2009, 48 pages.
U.S. Appl. No. 11/006,841: Supplemental Response mailed Jun. 26, 2009, 34 pages.
U.S. Appl. No. 11/006,841: Notice of Allowance mailed Jun. 29, 2009, 40 pages.
U.S. Appl. No. 11/006,841: Issue Fee mailed Sep. 29, 2009, 4 pages.
U.S. Appl. No. 11/006,841: Issue Notification mailed Nov. 11, 2009, 1 page.
U.S. Appl. No. 12/578,411: Continuation application filed Oct. 13, 2009, 75 pages.
U.S. Appl. No. 12/578,411: Notice of Missing Parts mailed Oct. 28, 2009, 6 pages.
U.S. Appl. No. 12/578,411: Response to Missing Parts filed Dec. 28, 2009, 25 pages.
U.S. Appl. No. 12/578,411: Filing Receipt mailed Jan. 7, 2010, 3 pages.
U.S. Appl. No. 12/578,411: Notice of Publication mailed Apr. 15, 2010, 1 page.
U.S. Appl. No. 12/578,411: Restriction requirement mailed Jun. 8, 2011, 6 pages.
U.S. Appl. No. 12/578,411: Response2 to restriction requirement mailed Jul. 6, 2011, 19 pages.
U.S. Appl. No. 12/578,411: Non-Final Office Action, mailed Aug. 23, 2011, 19 pages.
U.S. Appl. No. 12/578,411: Non-Final Office Action response mailed Dec. 22, 2011, 38 pages.
U.S. Appl. No. 12/578,411: Final Rejection mailed Jan. 20, 2012, 16 pages.
U.S. Appl. No. 12/578,411: Amendment, mailed May 21, 2012, 23 pages.
U.S. Appl. No. 12/578,411: Advisory Action, mailed May 31, 2012, 4 pages.
U.S. Appl. No. 12/578,411: RCE, mailed Jun. 12, 2012, 38 pages.
U.S. Appl. No. 12/578,411: Notice of Allowance, mailed Aug. 19, 2013, 19 pages.
U.S. Appl. No. 12/578,411: Issue fee payment and Rule 312 amendment, mailed Nov. 14, 2013, 14 pages.
U.S. Appl. No. 12/578,411: Examiner response to rule 312 amendment, mailed Nov. 19, 2013, 2 pages.
U.S. Appl. No. 12/578,411: Response to Amendment under rule 312, mailed Dec. 3, 2013, 3 pages.
U.S. Appl. No. 12/578,411: Issue Notification, mailed Dec. 18, 2013, 1 page.
U.S. Appl. No. 11/006,440: Application as filed on Dec. 6, 2004, 85 pages.
U.S. Appl. No. 11/006,440: Notice to file missing parts Jan. 11, 2005, 2 pages.
U.S. Appl. No. 11/006,440: Response to Notice to file missing parts mailed Mar. 15, 2005, 8 pages.
U.S. Appl. No. 11/006,440: Preliminary Amendment mailed Apr. 28, 2005, 140 pages.
U.S. Appl. No. 11/006,440: Preliminary Amendment and Substitute Specification mailed Oct. 10, 2006, 139 pages.
U.S. Appl. No. 11/006,440: Restriction Requirement mailed Mar. 29, 2007, 5 pages.
U.S. Appl. No. 11/006,440: Response to Restriction Requirement mailed Apr. 30, 2007, 42 pages.
U.S. Appl. No. 11/006,440: Non-Final Office Action mailed Jun. 21, 2007, 15 pages.
U.S. Appl. No. 11/006,440: Response to Non-Final Office Action mailed Nov. 20, 2007, 42 pages.
U.S. Appl. No. 11/006,440: Final Office Action mailed Feb. 6, 2008, 13 pages.
U.S. Appl. No. 11/006,440: Response to Final Office Action mailed Apr. 7, 2008, 34 pages.
U.S. Appl. No. 11/006,440: Advisory Action mailed May 9, 2008, 3 pages.
U.S. Appl. No. 11/006,440: Notice of appeal mailed Aug. 4, 2008, 1 page.
U.S. Appl. No. 11/006,440: RCE mailed Nov. 4, 2008, 39 pages.
U.S. Appl. No. 11/006,440: Final Office Action mailed Jan. 23, 2009, 22 pages.
U.S. Appl. No. 11/006,440: Amendment after Final mailed Apr. 23, 2009, 34 pages.
U.S. Appl. No. 11/006,440: Supplemental Amendment mailed Jul. 17, 2009, 29 pages.
U.S. Appl. No. 11/006,440: Notice of Allowance mailed Jul. 31, 2009, 15 pages.

(56) References Cited

OTHER PUBLICATIONS

U.S. Appl. No. 11/006,440: Examiner's Amendment and Reasons for Allowance mailed Sep. 3, 2009, 9 pages.
U.S. Appl. No. 11/006,440: Issue Fee mailed Nov. 2, 2009, 12 pages.
U.S. Appl. No. 11/006,440: Issue Notification mailed Dec. 2, 2009, 1 page.
U.S. Appl. No. 12/627,816: Continuation application filed Nov. 30, 2009, 95 pages.
U.S. Appl. No. 12/627,816: Notice of Missing Parts mailed Dec. 15, 2009, 2 pages.
U.S. Appl. No. 12/627,816: Response to Missing Parts filed Apr. 12, 2010, 21 pages.
U.S. Appl. No. 12/627,816: Filing Receipt mailed Apr. 20, 2010, 3 pages.
U.S. Appl. No. 12/627,816: Notice of Publication mailed Jul. 29, 2010, 1 page.
U.S. Appl. No. 12/627,816: Non-Final OA, mailed May 5, 2011, 19 pages.
U.S. Appl. No. 12/627,816: Non-Final Oa response, mailed Nov. 7, 2011, 12 pages.
U.S. Appl. No. 12/627,816: Final Rejection mailed Nov. 17, 2011, 18 pages.
U.S. Appl. No. 12/627,816: RCE mailed Feb. 17, 2012, 20 pages.
U.S. Appl. No. 12/627,816: Terminal disclaimer review, mailed Mar. 7, 2012, 1 page.
U.S. Appl. No. 12/627,816: Notice of Allowance, mailed Aug. 1, 2013, 16 pages.
U.S. Appl. No. 12/627,816: Issue fee payment and Rule 312 amendment, mailed Nov. 1, 2013, 14 pages.
U.S. Appl. No. 12/627,816: Examiner response to rule 312 amendment, mailed Nov. 13, 2013, 2 pages.
U.S. Appl. No. 12/627,816: Issue Notification, mailed Nov. 26, 2013, 1 page.
U.S. Appl. No. 14/086,808: Application as Filed on Nov. 21, 2013, 87 Pages.
U.S. Appl. No. 14/086,808: Notice to File Missing Parts and Filing Receipt, Mailed Dec. 11, 2013, 5 Pages.
U.S. Appl. No. 14/086,808: Applicant Response to Pre-Exam Formalities Notice, Mailed Jun. 11, 2014, 53 Pages.
U.S. Appl. No. 14/086,808: Filing receipt, Mailed Jun. 17, 2014, 3 Pages.
U.S. Appl. No. 14/086,808: Notice of Publication, Mailed Sep. 25, 2014, 1 Page.
U.S. Appl. No. 14/086,808: Terminal Disclaimer, Filed Oct. 24, 2014, 2 pages.
U.S. Appl. No. 14/086,808: Terminal Disclaimer Review Decision, Mailed Oct. 29, 2014, 1 page.
U.S. Appl. No. 14/086,808: Terminal Disclaimer, Filed Nov. 4, 2014, 2 pages.
U.S. Appl. No. 14/086,808: Terminal Disclaimer Review Decision, Mailed Nov. 13, 2014, 1 page.
U.S. Appl. No. 14/086,808: Examiner's search strategy and results, mailed Nov. 17, 2014, 5 pages.
U.S. Appl. No. 14/086,808: Notice of Allowance and fees, mailed Nov. 17, 2014, 16 pages.
U.S. Appl. No. 11/006,446: Application filed Dec. 6, 2004, 91 pages.
U.S. Appl. No. 11/006,446: Notice of Missing Parts mailed Jan. 24, 2005, 3 pages.
U.S. Appl. No. 11/006,446: Response to Notice to File Missing Parts mailed Mar. 29, 2005, 8 pages.
U.S. Appl. No. 11/006,446: Preliminary Amendment filed Apr. 28, 2005, 118 pages.
U.S. Appl. No. 11/006,446: Office Action—Restriction Requirement mailed Apr. 4, 2007, 5 pages.
U.S. Appl. No. 11/006,446: Response to Office Action—Restriction Requirement filed May 3, 2007, 6 pages.
U.S. Appl. No. 11/006,446: Non-final Office Action mailed Jul. 26, 2007, 45 pages.
U.S. Appl. No. 11/006,446: Amendment filed Nov. 26, 2007, 38 pages.
U.S. Appl. No. 11/006,446: Non-final Office Action mailed Feb. 20, 2008, 67 pages.
U.S. Appl. No. 11/006,446: Amendment filed Jul. 21, 2008, 33 pages.
U.S. Appl. No. 11/006,446: Final Office Action mailed Oct. 28, 2008, 49 pages.
U.S. Appl. No. 11/006,446: Amendment filed Dec. 29, 2008, 33 pages.
U.S. Appl. No. 11/006,446: Advisory Action mailed Jan. 7, 2009, 4 pages.
U.S. Appl. No. 11/006,446: RCE with Amendment filed Apr. 28, 2009, 38 pages.
U.S. Appl. No. 11/006,446: Non-final Office Action mailed Jul. 7, 2009, 41 pages.
U.S. Appl. No. 11/006,446: Examiner Interview Summary and Search Results mailed Oct. 26, 2009, 6 pages.
U.S. Appl. No. 11/006,446: Amendment mailed Dec. 7, 2009, 33 pages.
U.S. Appl. No. 11/006,446: Examiner Interview Summary mailed Mar. 19, 2010, 4 pages.
U.S. Appl. No. 11/006,446: Notice of Allowance/Allowability mailed Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment mailed Aug. 19, 2010, 2 pages.
U.S. Appl. No. 11/006,446: Formal drawings mailed Aug. 25, 2010, 29 pages.
U.S. Appl. No. 11/006,446: Issue Notification mailed Sep. 1, 2010, 1 page.
U.S. Appl. No. 12/830,236: Divisional Application filed Jul. 2, 2010, 103 pages.
U.S. Appl. No. 12/830,236: Notice to File Corrected Application Papers mailed Jul. 16, 2010, 5 pages.
U.S. Appl. No. 12/830,236: Response to Notice to File Corrected Application Papers mailed Aug. 25, 2010, 32 pages.
U.S. Appl. No. 12/830,236: Filing receipt mailed Sep. 3, 2010, 3 pages.
U.S. Appl. No. 12/830,236: Notice of Publication mailed Dec. 16, 2010, 1 page.
U.S. Appl. No. 12/830,236: Restriction requirement mailed Mar. 18, 2011, 6 pages.
U.S. Appl. No. 12/830,236: Restriction requirement response, mailed Apr. 18, 2011, 5 pages.
U.S. Appl. No. 12/830,236: Non-Final Office Action, mailed May 11, 2011, 10 pages.
U.S. Appl. No. 12/830,236: Response to Non-Final Office Action mailed Jul. 6, 2011, 18 pages.
U.S. Appl. No. 12/830,236: Final Office Action, mailed Oct. 14, 2011, 18 pages.
U.S. Appl. No. 12/830,236: Amendment after final, filed Jan. 17, 2012, 26 pages.
U.S. Appl. No. 12/830,236: Advisory Action, mailed Feb. 8, 2012, 6 pages.
U.S. Appl. No. 12/830,236: Notice of Appeal filed Mar. 8, 2012, 3 pages.
U.S. Appl. No. 12/830,236: RCE, filed Jun. 5, 2012, 23 pages.
U.S. Appl. No. 12/830,236: Non-Final Office Action, mailed Jul. 31, 2012, 18 pages.
U.S. Appl. No. 12/830,236: Amendment, filed Nov. 1, 2012, 27 pages.
U.S. Appl. No. 12/830,236: Final Office Action, mailed Feb. 27, 2013, 35 pages.
U.S. Appl. No. 12/830,236: Response after final, mailed Jun. 27, 2013, 36 pages.
U.S. Appl. No. 12/830,236: Advisory action, mailed Jul. 12, 2013, 4 pages.
U.S. Appl. No. 12/830,236: Notice of appeal, filed Jul. 19, 2013, 2 pages.
U.S. Appl. No. 12/830,236: Appeal brief, filed Sep. 18, 2013, 44 pages.
U.S. Appl. No. 12/830,236: Examiners answer to appeal brief, mailed Dec. 18, 2013, 35 pages.

(56) References Cited

OTHER PUBLICATIONS

U.S. Appl. No. 12/830,236: Reply Brief as Filed on Feb. 18, 2014, 16 Pages.
U.S. Appl. No. 12/830,236: Appeal Docketing Notice, Mailed Mar. 21, 2014, 2 Pages.
U.S. Appl. No. 11/385,257: Application filed Mar. 20, 2006, 118 pages.
U.S. Appl. No. 11/385,257: Notice of Missing Parts mailed May 3, 2006, 2 pages.
U.S. Appl. No. 11/385,257: Response to Missing Parts filed Aug. 3, 2006, 46 pages.
U.S. Appl. No. 11/385,257: Notice of Publication mailed Nov. 30, 2006, 1 page.
U.S. Appl. No. 11/385,257: Non-final Office Action mailed Apr. 29, 2008, 44 pages.
U.S. Appl. No. 11/385,257: Amendment filed Jul. 29, 2008, 29 pages.
U.S. Appl. No. 11/385,257: Final Office Action mailed Dec. 9, 2008, 47 pages.
U.S. Appl. No. 11/385,257: RCE with Amendment filed May 11, 2009, 38 pages.
U.S. Appl. No. 11/385,257: Supplemental Amendment filed May 26, 2009, 32 pages.
U.S. Appl. No. 11/385,257: Notice of Non-Compliant Amendment mailed Jun. 1, 2009, 3 pages.
U.S. Appl. No. 11/385,257: Amendment filed Jun. 30, 2009, 34 pages.
U.S. Appl. No. 11/385,257: Non-final Office Action mailed Sep. 14, 2009, 60 pages.
U.S. Appl. No. 11/385,257: Response to Non-Final Office Action filed Jan. 13, 2010, 34 pages.
U.S. Appl. No. 11/385,257: Final Office Action mailed Apr. 12, 2010, 47 pages.
U.S. Appl. No. 11/385,257: RCE mailed Aug. 12, 2010, 35 pages.
U.S. Appl. No. 11/385,257: Office Action mailed Sep. 30, 2010, 39 pages.
U.S. Appl. No. 11/385,257: Office Action response, mailed Mar. 29, 2011, 31 pages.
U.S. Appl. No. 11/385,257: Final Rejection mailed Jun. 1, 2011, 40 pages.
U.S. Appl. No. 11/385,257: Request for continued Examination mailed Nov. 1, 2011, 30 pages.
U.S. Appl. No. 11/385,257: Non-Final Office Action, mailed Jan. 9, 2012, 40 pages.
U.S. Appl. No. 11/385,257: Amendment, mailed Apr. 6, 2012, 30 pages.
U.S. Appl. No. 11/385,257: Notice of allowance and Examiner interview summary, mailed Jun. 22, 2012, 36 pages.
U.S. Appl. No. 11/385,257: Office communication concerning previous IDS filing, mailed Oct. 4, 2012, 4 pages.
U.S. Appl. No. 11/385,257: Miscellaneous Communication to Applicant, mailed Oct. 15, 2012, 3 pages.
U.S. Appl. No. 11/385,257: Rule 312 Amendment, mailed Dec. 12, 2012, 10 pages.
U.S. Appl. No. 11/385,257: Issue Notification, mailed Dec. 22, 2012, 1 page.
U.S. Appl. No. 13/625,812: Application as filed on Sep. 24, 2012, 123 pages.
U.S. Appl. No. 13/625,812: Notice to file missing parts, mailed Oct. 15, 2012, 6 pages.
U.S. Appl. No. 13/625,812: Response to Notice to file missing parts and preliminary amendment, mailed Mar. 8, 2013, 47 pages.
U.S. Appl. No. 13/625,812: Notice of incomplete reply, mailed Mar. 15, 2013, 3 pages.
U.S. Appl. No. 13/625,812: Response to incomplete reply notice mailed Apr. 2, 2013, 5 pages.
U.S. Appl. No. 13/625,812: Non-Final office action, mailed Jul. 26, 2013, 29 pages.
U.S. Appl. No. 13/625,812: Publication notice, mailed Aug. 1, 2013, 1 page.
U.S. Appl. No. 13/625,812: Response to non-final office action, mailed Oct. 9, 2013, 15 pages.
U.S. Appl. No. 13/625,812: Final rejection, mailed Dec. 3, 2013, 28 pages.
U.S. Appl. No. 13/625,812: Response After Final Action, Mailed Apr. 1, 2014, 1 Page.
U.S. Appl. No. 13/625,812: Advisory Action (PTOL-303), Mailed Apr. 9, 2014, 3 Pages.
U.S. Appl. No. 13/625,812: Notice of Appeal, filed May 5, 2014, 1 Page.
U.S. Appl. No. 13/625,812: Request for Continued Examination, Mailed Aug. 4, 2014, 18 Pages.
U.S. Appl. No. 13/625,812: Request for Corrected Filing Receipt, Mailed Aug. 21, 2014, 6 Pages.
U.S. Appl. No. 13/625,812: Filing Receipt, Mailed Aug. 27, 2014, 3 Pages.
U.S. Appl. No. 11/319,758: Application filed Dec. 27, 2005, 79 pages.
U.S. Appl. No. 11/319,758: Notice of Missing Parts mailed Feb. 1, 2006, 2 pages.
U.S. Appl. No. 11/319,758: Response to Missing Parts filed Jul. 3, 2006, 15 pages.
U.S. Appl. No. 11/319,758: Non-final Office Action mailed Nov. 12, 2008, 46 pages.
U.S. Appl. No. 11/319,758: Amendment filed May 12, 2009, 40 pages.
U.S. Appl. No. 11/319,758: Final Office Action mailed Aug. 3, 2009, 39 pages.
U.S. Appl. No. 11/319,758: RCE filed Jan. 4, 2010, 45 pages.
U.S. Appl. No. 11/319,758: Non-Final Office Action mailed Mar. 30, 2010, 39 pages.
U.S. Appl. No. 11/319,758: Office Action response mailed Jul. 29, 2010, 30 pages.
U.S. Appl. No. 11/319,758: Final Office Action mailed Oct. 28, 2010, 31 pages.
U.S. Appl. No. 11/319,758: Request for Continued Examination, mailed Mar. 28, 2011, 32 pages.
U.S. Appl. No. 11/319,758: Non-Final Office action mailed Jun. 3, 2011, 31 pages.
U.S. Appl. No. 11/319,758: Non-Final Office Action Response mailed Nov. 3, 2011, 29 pages.
U.S. Appl. No. 11/319,758: Final Office Action, mailed Jan. 17, 2012, 22 pages.
U.S. Appl. No. 11/319,758: Amendment after final, mailed May 17, 2012, 34 pages.
U.S. Appl. No. 11/319,758: Advisory Action, mailed Jun. 20, 2012, 3 pages.
U.S. Appl. No. 11/319,758: Amendment after final, mailed Jun. 28, 2012, 29 pages.
U.S. Appl. No. 11/319,758: Notice of Allowance and examiner's interview summary, mailed Jul. 17, 2012, 10 pages.
U.S. Appl. No. 11/319,758: Isue Fee payment, Rule 312 and Miscellaneous Communication, mailed Oct. 12, 2012, 12 pages.
U.S. Appl. No. 11/319,758: Issue Notification, mailed Oct. 31, 2012, 1 page.
U.S. Appl. No. 13/632,581: Application as Filed on Oct. 1, 2012, 88 Pages.
U.S. Appl. No. 13/632,581: Notice to File Missing Parts and Filing Receipt, Mailed Oct. 22, 2012, 27 Pages.
U.S. Appl. No. 13/632,581: Filing Receipt, Mailed Mar. 5, 2004, 3 Pages.
U.S. Appl. No. 13/632,581: Notice of Publication, Mailed Jun. 13, 2013, 1 Page.
U.S. Appl. No. 13/632,581: Non-final Office Action, Mailed Jul. 3, 2013, 22 Pages.
U.S. Appl. No. 13/632,581: Non-Final Office Action Response, Mailed Sep. 11, 2013, 23 Pages.
U.S. Appl. No. 13/632,581: Final Office Action, Mailed 121813, 27 Pages.
U.S. Appl. No. 13/632,581: Response After Final Action, Mailed Mar. 18, 2014, 37 Pages.
U.S. Appl. No. 13/632,581: Advisory Action (PTOL-303), Mailed Apr. 3, 2014, 4 Pages.

(56) References Cited

OTHER PUBLICATIONS

U.S. Appl. No. 13/632,581: Notice of Appeal Filed Jul. 17, 2014, 2 Pages.
U.S. Appl. No. 13/632,581: Request for Continued Examination, Mailed Jul. 16, 2014, 23 Pages.
U.S. Appl. No. 13/632,581 Notice of Non-Responsive, Non-Compliant Amendment, Mailed Oct. 20, 2014, 5 pages.
U.S. Appl. No. 13/632,581: Amendment/Req Reconsideration after Non-Final Reject, Filed Nov. 4, 2014, 16 pages.
U.S. Appl. No. 11/006,842: Application as filed on Dec. 7, 2004, 58 pages.
U.S. Appl. No. 11/006,842: Notice to file missing parts Jan. 10, 2005, 2 pages.
U.S. Appl. No. 11/006,842: Response to Notice to file missing parts mailed Apr. 1, 2005, 7 pages.
U.S. Appl. No. 11/006,842: Preliminary Amendment mailed May 2, 2005, 93 pages.
U.S. Appl. No. 11/006,842: Restriction Requirement mailed Jan. 23, 2008, 5 pages.
U.S. Appl. No. 11/006,842: Response to Restriction Requirement mailed Feb. 25, 2008, 25 pages.
U.S. Appl. No. 11/006,842: Restriction Requirement mailed May 13, 2008, 5 pages.
U.S. Appl. No. 11/006,842: Response to Restriction Requirement Aug. 13, 2008, 24 pages.
U.S. Appl. No. 11/006,842: Non-Final Office Action mailed Nov. 3, 2008.
U.S. Appl. No. 11/006,842: Response to Non-Final Office Action mailed May 4, 2009, 35 pages.
U.S. Appl. No. 11/006,842: Supplemental Response mailed Jul. 17, 2009, 23 pages.
U.S. Appl. No. 11/006,842: Notice of Allowance mailed Jul. 27, 2009, 13 pages.
U.S. Appl. No. 11/006,842: Issue Fee filed Oct. 27, 2009, 1 page.
U.S. Appl. No. 11/006,842: Issue notification mailed Nov. 18, 2009, 1 page.
U.S. Appl. No. 12/613,450: Continuation application filed Nov. 5, 2009, 63 pages.
U.S. Appl. No. 12/613,450: Notice of Missing Parts mailed Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450: Filing receipt mailed Jan. 27, 2010, 3 pages.
U.S. Appl. No. 12/613,450: Notice of Publication mailed May 6, 2010, 1 page.
U.S. Appl. No. 12/613,450: Restriction requirement mailed Jun. 10, 2011, 5 pages.
U.S. Appl. No. 12/613,450: Response to restriction requirement mailed Jul. 6, 2011, 17 pages.
U.S. Appl. No. 12/613,450: Non-Final Office Action, mailed Aug. 25, 2011, 15 pages.
U.S. Appl. No. 12/613,450: Non-Final OA response mailed Dec. 27, 2011, 28 pages.
U.S. Appl. No. 12/613,450: final rejection, mailed Feb. 14, 2012, 14 pages.
U.S. Appl. No. 12/613,450: Amendment after final, mailed Jun. 8, 2012, 23 pages.
U.S. Appl. No. 12/613,450: Advisory Action, mailed Jun. 20, 2012, 4 pages.
U.S. Appl. No. 12/613,450: RCE, mailed Jul. 12, 2012, 25 pages.
U.S. Appl. No. 12/613,450: Notice of Allowance, mailed Oct. 7, 2013, 20 pages.
U.S. Appl. No. 12/613,450: Electronic Terminal Disclaimer filed and approved, Jan. 2, 2014, 2 pages.
U.S. Appl. No. 12/613,450: Amendment After Final or Under 37CFR 1.312, initialed by the Examiner, Mailed Jan. 14, 2014, 2 Pages.
U.S. Appl. No. 12/613,450: Issue Notification, Mailed Jan. 22, 2014, 1 Page.
U.S. Appl. No. 14/149,749: Application as Filed on Jan. 7, 2014, 59 Pages.
U.S. Appl. No. 14/149,749: Notice to File Missing Parts and Filing Receipt, Mailed Jan. 23, 2014, 6 Pages.
U.S. Appl. No. 14/149,749: Applicant Response to Pre-exam Formalities Notice, Mailed May 23, 2014, 12 Pages.
U.S. Appl. No. 14/149,749: Applicant Response to Pre-Exam Formalities Notice, Mailed Aug. 25, 2014, 103 Pages.
U.S. Appl. No. 14/149,749: Filing Receipt, Mailed Sep. 4, 2014, 3 Pages.
U.S. Appl. No. 11/320,538: Application filed Dec. 27, 2005, 76 pages.
U.S. Appl. No. 11/320,538: Notice of Missing Parts mailed Feb. 2, 2006, 2 pages.
U.S. Appl. No. 11/320,538: Response to Missing Parts filed Aug. 2, 2006, 36 pages.
U.S. Appl. No. 11/320,538: Non-final Office Action mailed Apr. 1, 2009, 27 pages.
U.S. Appl. No. 11/320,538: Amendment filed Jul. 1, 2009, 54 pages.
U.S. Appl. No. 11/320,538: Final Office Action mailed Nov. 2, 2009, 29 pages.
U.S. Appl. No. 11/320,538: Response to Final Office Action filed Jan. 4, 2010, 23 pages.
U.S. Appl. No. 11/320,538: Advisory Action mailed Jan. 19, 2010, 3 pages.
U.S. Appl. No. 11/320,538: RCE and Amendment filed Apr. 2, 2010, 26 pages.
U.S. Appl. No. 11/320,538: Non-Final Office Action mailed Jun. 9, 2010, 24 pages.
U.S. Appl. No. 11/320,538: Office action mailed Dec. 22, 2010, 10 pages.
U.S. Appl. No. 11/320,538: Notice of Appeal, mailed May 23, 2011, 6 pages.
U.S. Appl. No. 11/320,538: Pre-brief appeal conference decision mailed Jun. 30, 2011, 2 pages.
U.S. Appl. No. 11/320,538: Request for Continued Examination mailed Dec. 23, 2011, 21 pages.
U.S. Appl. No. 11/320,538: Non-Final Office Action, mailed Dec. 19, 2012, 12 pages.
U.S. Appl. No. 11/320,538: Response to Non-final office action, mailed Apr. 17, 2013, 20 pages.
U.S. Appl. No. 11/320,538: Notice of allowance, mailed Aug. 1, 2013, 25 pages.
U.S. Appl. No. 11/320,538: Issue fee payment, mailed Nov. 1, 2013, 7 pages.
U.S. Appl. No. 11/320,538: Rule 312 amendment, mailed Nov. 19, 2013, 20 pages.
U.S. Appl. No. 11/320,538: Issue Notification, mailed Dec. 4, 2013, 1 page.
U.S. Appl. No. 14/086,741: Application as Filed on Dec. 12, 2013, 77 Pages.
U.S. Appl. No. 14/086,741: Filing Receipt and Notice to File Missing Parts, Mailed Dec. 12, 2013, 6 Pages.
U.S. Appl. No. 14/086,741: Applicant Response to Pre-Exam Formalities Notice, Mailed Jun. 12, 2014, 60 Pages.
U.S. Appl. No. 14/086,741: Filing Receipt, Mailed Jun. 17, 2014, 3 Pages.
U.S. Appl. No. 14/086,741: Notice of Publication, Mailed Sep. 25, 2014, 1 Page.
U.S. Appl. No. 14/086,741: Terminal Disclaimer as Filed on Sep. 29, 2014, 1 Page.
U.S. Appl. No. 14/086,741: Terminal Disclaimer Review Decision, Mailed Sep. 30, 2014, 1 Page.
U.S. Appl. No. 14/086,741: Notice of Allowance and Fees and Examiner Summary, Mailed Oct. 3, 2014, 21 pages.
U.S. Appl. No. 14/086,741: Notice of Allowance and Fees Due, Filed Oct. 3, 2014, 22 pages.
U.S. Appl. No. 11/361,500: Application as filed on Feb. 23, 2006, 72 pages.
U.S. Appl. No. 11/361,500: Notice to file missing parts mailed Mar. 23, 2006, 2 pages.
U.S. Appl. No. 11/361,500: Response to Notice to Fule Missing Parts mailed Jul. 19, 2006, 27 pages.

(56) References Cited

OTHER PUBLICATIONS

U.S. Appl. No. 11/361,500: Notice of Publication mailed Nov. 16, 2006, 1 page.
U.S. Appl. No. 11/361,500: Office Action mailed May 27, 2009, 18 pages.
U.S. Appl. No. 11/361,500: Response to Office Action mailed Aug. 27, 2009, 34 pages.
U.S. Appl. No. 11/361,500: Notice of Allowance mailed Dec. 11, 2009, 8 pages.
U.S. Appl. No. 11/361,500: Issue Fee Payment and Rule 312 Amendment mailed Jan. 6, 2010, 28 pages.
U.S. Appl. No. 11/361,500: Response to Rule 312 Amendment Jan. 25, 2010, 4 pages.
U.S. Appl. No. 11/361,500: Issue Notification mailed Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts mailed Feb. 25, 2010, 2 pages.
U.S. Appl. No. 12/702,243: Response to Missing Parts filed Apr. 26, 2010, 8 pages.
U.S. Appl. No. 12/702,243: Filing receipt mailed May 4, 2010, 3 pages.
U.S. Appl. No. 12/702,243: Notice of Publication mailed Aug. 12, 2010, 1 page.
U.S. Appl. No. 12/702,243: Non-Final rejection, mailed Aug. 30, 2012, 8 pages.
U.S. Appl. No. 12/702,243: Amendment, mailed Nov. 20, 2012, 14 pages.
U.S. Appl. No. 12/702,243: Terminal Disclaimer, mailed Jan. 2, 2013, 5 pages.
U.S. Appl. No. 12/702,243: Terminal Disclaimer decision, mailed Jan. 4, 2013, 1 page.
U.S. Appl. No. 12/702,243: Notice of allowance and fees due and examiner interview summary, mailed Jan. 10, 2013, pages.
U.S. Appl. No. 12/702,243: Issue notification, mailed Apr. 24, 2013, 1 page.
U.S. Appl. No. 13/860,482: Application as Filed on Apr. 10, 2013, 98 Pages.
U.S. Appl. No. 13/860,482: Notice to File Missing Parts and Filing Receipt, Mailed May 21, 2013, 5 Pages.
U.S. Appl. No. 13/860,482: Applicant Response to Pre-Exam Formalities Notice, Mailed Oct. 22, 2013, 3 Pages.
U.S. Appl. No. 13/860,482: Notice of Publication, Mailed Feb. 6, 2014, 1 Page.
U.S. Appl. No. 13/860,482: Non-Final Office Action, Mailed Jun. 9, 2014, 11 Pages.
U.S. Appl. No. 13/860,482: Non-Final Office Action Response, Mailed Sep. 8, 2014, 19 Pages.
U.S. Appl. No. 13/860,482: Terminal Disclaimer Review Decision, Sep. 9, 2014, 1 page.
U.S. Appl. No. 13/860,482: Terminal Disclaimer Filed, Oct. 8, 2014, 1 page.
U.S. Appl. No. 13/860,482: Terminal Disclaimer Review Decision, Oct. 9,2014, 1 page.
U.S. Appl. No. 13/860,482: Notice of Allowance and Fees Due, Mailed Nov. 5, 2014, 8 pages.
U.S. Appl. No. 11/412,417: Application filed Apr. 26, 2006, 96 pages.
U.S. Appl. No. 11/412,417: Notice of Missing Parts mailed May 19, 2006, 2 pages.
U.S. Appl. No. 11/412,417: Response to Notice of Missing Parts filed Jul. 19, 2006, 14 pages.
U.S. Appl. No. 11/412,417: Non-final Office Action mailed Apr. 1, 2008, 53 pages.
U.S. Appl. No. 11/412,417: Amendment filed Aug. 1, 2008, 34 pages.
U.S. Appl. No. 11/412,417: Final Office Action mailed Nov. 13, 2008, 40 pages.
U.S. Appl. No. 11/412,417: RCE and Amendment filed May 12, 2009, 36 pages.
U.S. Appl. No. 11/412,417: Non-final Office Action mailed Jun. 30, 2009, 141 pages.
U.S. Appl. No. 11/412,417: Examiner Interview Summary mailed Oct. 30, 2009, 3 pages.
U.S. Appl. No. 11/412,417: Amendment filed Oct. 30, 2009, 33 pages.
U.S. Appl. No. 11/412,417: Final Office Action mailed Jan. 4, 2010, 37 pages.
U.S. Appl. No. 11/412,417: RCE with Amendment filed May 4, 2010, 27 pages.
U.S. Appl. No. 11/412,417: Supplemental Office Action Response mailed Jun. 22, 2010, 22 pages.
U.S. Appl. No. 11/412,417: Notice of Allowance and bibliographic data sheet mailed Jul. 6, 2010, 9 pages.
U.S. Appl. No. 11/412,417: RCE mailed Oct. 5, 2010, 4 pages.
U.S. Appl. No. 11/412,417: Notice of Allowance and bibliographic data sheet mailed Oct. 26, 2010, 4 pages.
U.S. Appl. No. 11/412,417: Issue Fee Payment and Comments on Reasons for Allowance mailed Jan. 26, 2011, 6 pages.
U.S. Appl. No. 11/412,417: Issue Notification mailed Feb. 9, 2011, 1 page.
U.S. Appl. No. 13/030,084: Application filed Feb. 17, 2011, 103 pages.
U.S. Appl. No. 13/030,084: Filing receipt and Notice to File Missing parts mailed Mar. 3, 2011, 6 pages.
U.S. Appl. No. 13/030,084: Response to Notice to File Missing Parts, mailed Aug. 3, 2011, 23 pages.
U.S. Appl. No. 13/030,084: Updated filing receipt, mailed Aug. 11, 2011, 3 pages.
U.S. Appl. No. 13/030,084: Non-Final Rejection mailed Oct. 26, 2011, 34 pages.
U.S. Appl. No. 13/030,084: Notice of Publication mailed Nov. 17, 2011, 1 page.
U.S. Appl. No. 13/030,084: Amendment, mailed Jan. 26, 2012, 35 pages.
U.S. Appl. No. 13/030,084: Notice regarding non-compliant amendment, mailed Jan. 31, 2012, 4 pages.
U.S. Appl. No. 13/030,084: Amendment, mailed Feb. 9, 2012, 35 pages.
U.S. Appl. No. 13/030,084: Final Rejection, mailed Mar. 28, 2012, 62 pages.
U.S. Appl. No. 13/030,084: Amendment after final, mailed Jun. 14, 2012, 88 pages.
U.S. Appl. No. 13/030,084: Advisory Action, mailed Jun. 26, 2012, 4 pages.
U.S. Appl. No. 13/030,084: RCE, mailed Jul. 23, 2012, 89 pages.
U.S. Appl. No. 13/030,084: Notice regarding non-compliant amendment, mailed Jul. 25, 2012, 2 pages.
U.S. Appl. No. 13/030,084: Amendment, mailed Jan. 2, 2013, 40 pages.
U.S. Appl. No. 13/030,084: Refund request, mailed Jan. 23, 2013 17 pages.
U.S. Appl. No. 13/030,084: Non-Final office action, mailed Apr. 30, 2013, 39 pages.
U.S. Appl. No. 13/030,084: Response to non-final office action, mailed Jul. 30, 2013, 28 pages.
U.S. Appl. No. 13/030,084: Non-final office action, mailed Oct. 10, 2013, 44 pages.
U.S. Appl. No. 13/030,084: Response after Non-Final Reject, Mailed Jan. 2, 2014, 1 Page.
U.S. Appl. No. 13/030,084: Final Rejection, Mailed Mar. 19, 2014, 41 Pages.
U.S. Appl. No. 13/030,084: Amendment Submitted/Entered with Filing of CPA/RCE, Mailed May 19, 2014, 38 Pages.
U.S. Appl. No. 13/030,084: Advisory Action (PTOL-303), Mailed Jun. 6, 2014, 4 Pages.
U.S. Appl. No. 13/030,084: Applicant Initiated Interview Summary (PTOL-413), Mailed Jul. 1, 2014, 3 Pages.
U.S. Appl. No. 13/030,084: Request for Continued Examination, Mailed Aug. 15, 2014, 26 Pages.
U.S. Appl. No. 11/480: Application filed Jun. 29, 2006, 125 pages.
U.S. Appl. No. 11/480,094: Notice to File Corrected Application Papers mailed Aug. 2, 2006, 2 pages.

(56) References Cited

OTHER PUBLICATIONS

U.S. Appl. No. 11/480,094: Response to Notice to File Corrected Application Papers filed Nov. 2, 2006, 32 pages.
U.S. Appl. No. 11/480,094: Filing Receipt mailed Dec. 7, 2006, 3 pages.
U.S. Appl. No. 11/480,094: Non-final Office Action mailed Nov. 7, 2008, 28 pages.
U.S. Appl. No. 11/480,094: Amendment filed May 7, 2009, 37 pages.
U.S. Appl. No. 11/480,094: Final Office Action mailed Jul. 28, 2009, 16 pages.
U.S. Appl. No. 11/480,094: RCE with Amendment filed Dec. 28, 2009, 39 pages.
U.S. Appl. No. 11/480,094: Office Action mailed Dec. 15, 2010, 15 pages.
U.S. Appl. No. 11/480,094: Office Action response, mailed May 16, 2011, 29 pages.
U.S. Appl. No. 11/480,094: Final Office Action, mailed Aug. 1, 2011, 13 pages.
U.S. Appl. No. 11/480,094: Amendment after final Nov. 1, 2011, 32 pages.
U.S. Appl. No. 11/480,094: Advisory Action mailed Nov. 14, 2011, 3 pages.
U.S. Appl. No. 11/480,094: Notice of Appeal mailed Nov. 28, 2011, 1 page.
U.S. Appl. No. 11/480,094: Abandonment, mailed Jul. 31, 2012, 2 pages.

* cited by examiner

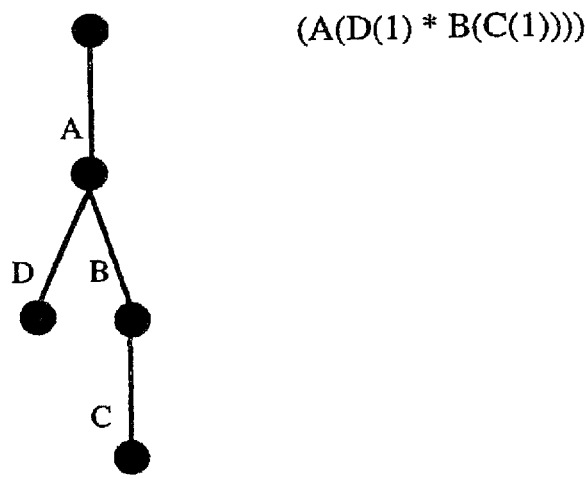
(A(D(1) * B(C(1))))
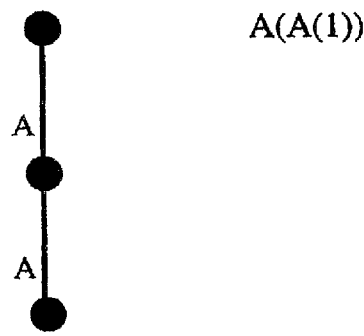
A(A(1))
D(1)
200  Fig. 2

$Q(0) \Rightarrow 2$ $Q(1) \Rightarrow 3$ $Q(2) \Rightarrow 5$ $Q(3) \Rightarrow 7$ $Q(4) \Rightarrow 11$ $Q(5) \Rightarrow 13$ $Q(6) \Rightarrow 17$ $Q(7) \Rightarrow 19$ $Q(8) \Rightarrow 23$ $Q(9) \Rightarrow 29$ $Q(10) \Rightarrow 31$ $Q(11) \Rightarrow 37$ $Q(12) \Rightarrow 41$

Finite Rooted Unordered 2 Valued Edge-Labeled Trees

*Signature* = < 2 , 2 , 1 >
*Alphabet* = {0, 1, A, B, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1.$$

*Core Model Isomorph (based upon the natural number universe)*

$$A(x) = Q(2x - 2), x \text{ not } 0;$$
$$B(x) = Q(2x - 1), x \text{ not } 0;$$

$$(x * y) = (x \text{ multiplied by } y).$$

700   Fig. 7

Finite Rooted Unordered 3 Valued Edge-Labeled Trees

*Signature* = < 2, 3, 1 >
*Alphabet* = {0, 1, A, B, C, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1.$$

*Core Model Isomorph (based upon the natural number universe)*

$$A(x) = Q(3x - 3), x \text{ not } 0;$$
$$B(x) = Q(3x - 2), x \text{ not } 0;$$
$$C(x) = Q(3x - 1), x \text{ not } 0;$$

$$(x * y) = (x \text{ multiplied by } y).$$

Fig. 8

Finite Rooted Unordered 4 Valued Edge-Labeled Trees

*Signature* = < 2, 4, 1 >
*Alphabet* = {0, 1, A, B, C, D, * }

*Expressions*

910 — $(x * y) = (y * x);$
920 — $((x * y) * z) = (x * (y * z));$

930 — $\begin{cases} (0 * x) = 0; \\ (1 * x) = x; \end{cases}$

940 — $\begin{cases} A(0) = 1; \\ B(0) = 1; \\ C(0) = 1; \\ D(0) = 1. \end{cases}$

*Core Model Isomorph (based upon the natural number universe)*

$A(x) = Q(4x - 4), x \text{ not } 0;$
$B(x) = Q(4x - 3), x \text{ not } 0;$
$C(x) = Q(4x - 2), x \text{ not } 0;$
$D(x) = Q(4x - 1), x \text{ not } 0;$ $(x * y) = (x \text{ multiplied by } y).$ 900      Fig. 9

Finite Rooted Unordered 5 Valued Edge-Labeled Trees

*Signature* = < 2 , 5 , 1 >
*Alphabet* = {0, 1, A, B, C, D, E *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1.$$

*Core Model Isomorph (based upon the natural number universe)*

$$A(x) = Q(5x - 5), x \text{ not } 0;$$
$$B(x) = Q(5x - 4), x \text{ not } 0;$$
$$C(x) = Q(5x - 3), x \text{ not } 0;$$
$$D(x) = Q(5x - 2), x \text{ not } 0;$$
$$E(x) = Q(5x - 1), x \text{ not } 0;$$

$$(x * y) = (x \text{ multiplied by } y).$$

1000    Fig. 10

Finite Rooted Unordered 6 Valued Edge-Labeled Trees

*Signature* = <2, 6, 1>
*Alphabet* = {0, 1, A, B, C, D, E, F *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1;$$
$$F(0) = 1.$$

*Core Model Isomorph (based upon the natural number universe)*

$$A(x) = Q(6x - 6), x \text{ not } 0;$$
$$B(x) = Q(6x - 5), x \text{ not } 0;$$
$$C(x) = Q(6x - 4), x \text{ not } 0;$$
$$D(x) = Q(6x - 3), x \text{ not } 0;$$
$$E(x) = Q(6x - 2), x \text{ not } 0;$$
$$F(x) = Q(6x - 1), x \text{ not } 0;$$

$$(x * y) = (x \text{ multiplied by } y).$$

1100                Fig. 11

|    | 2-ary | 3-ary | 4-ary | 5-ary | 6-ary |
|----|-------|-------|-------|-------|-------|
| 0  | ○ | [------------------------------------------------> |  |  |  |
| 1  | ● | [------------------------------------------------> |  |  |  |
| 2  | A│ | [------------------------------------------------> |  |  |  |
| 3  | B│ | [------------------------------------------------> |  |  |  |
| 4  | A/A\ | [------------------------------------------------> |  |  |  |
| 5  | A│A│ | C│ | [---------------------------------------> |  |  |
| 6  | A/B\ | [------------------------------------------------> |  |  |  |
| 7  | B│A│ | A│A│ | D│ | [--------------------------> |  |
| 8  | A/A│A\ | [------------------------------------------------> |  |  |  |
| 9  | B/B\ | [------------------------------------------------> |  |  |  |
| 10 | A/A\A│ | A/C\ | [---------------------------------------> |  |  |

| Natural # | BEL Trees |
|---|---|
| 0 |  |
| 1 |  |
| 2 |  |
| 3 |  |
| 4 | 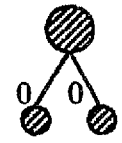 |
| 5 |  |
| 6 | 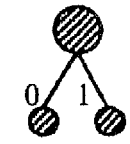 |
1600   Fig. 16

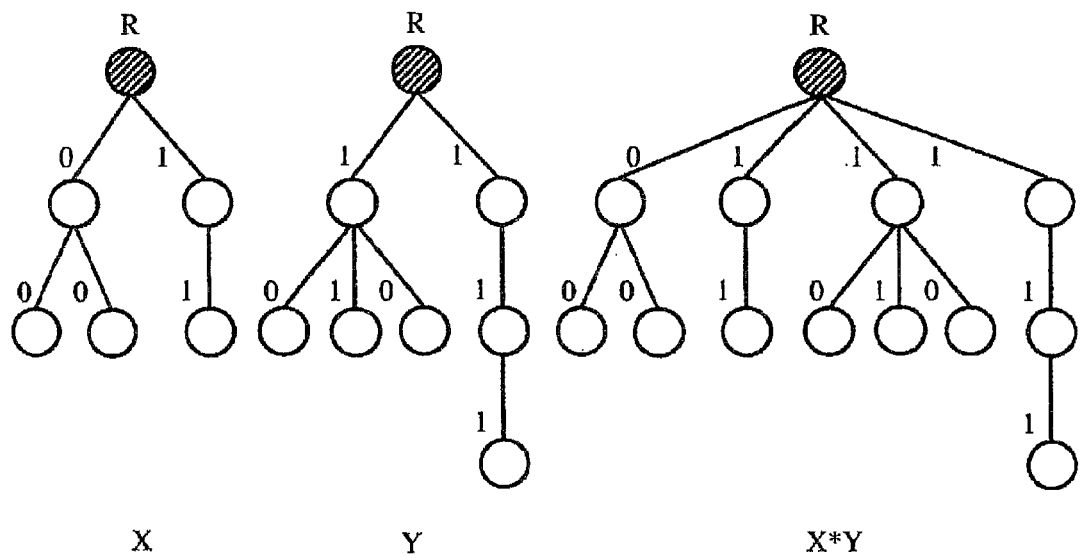
1700  Fig. 17

METHOD AND/OR SYSTEM FOR MANIPULATING TREE EXPRESSIONS

This disclosure claims priority pursuant to 35 USC 119(e) from U.S. provisional patent application Ser. No. 60/623,280, filed on Oct. 29, 2004, by LeTourneau, titled, "METHOD AND/OR SYSTEM FOR MANIPULATING TREE EXPRESSIONS," assigned to the assignee of the presently claimed subject matter.

BACKGROUND

This disclosure is related to manipulating tree expressions
In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 2 is a schematic diagram of embodiments of several unordered edge-labeled trees and symbolic expressions mathematically representing the tree embodiments;

FIG. 6 is a table providing an embodiment of a function that relates natural numerals to composite numerals;

FIG. 7 is a table providing symbolic expressions for an embodiment of rooted, unordered, 2-valued edge-labeled trees;

FIG. 8 is a table providing symbolic expressions for an embodiment of rooted, unordered, 3-valued edge-labeled trees;

FIG. 9 is a table providing symbolic expressions for an embodiment of rooted, unordered, 4-valued edge-labeled trees;

FIG. 10 is a table providing symbolic expressions for an embodiment of rooted, unordered, 5-valued edge-labeled trees;

FIG. 11is a table providing symbolic expressions for an embodiment of rooted, unordered, 6-valued edge-labeled trees;

FIGS. 12 and 13 provide an embodiment of a table relating the natural numerals and embodiments of different tree views;

FIG. 16 is a table illustrating an embodiment of a relationship between BELTs and natural numerals; and FIG. 17 is a schematic diagram illustrating an embodiment of merging two edge-labeled trees.

DETAILED DESCRIPTION

Figure 1:
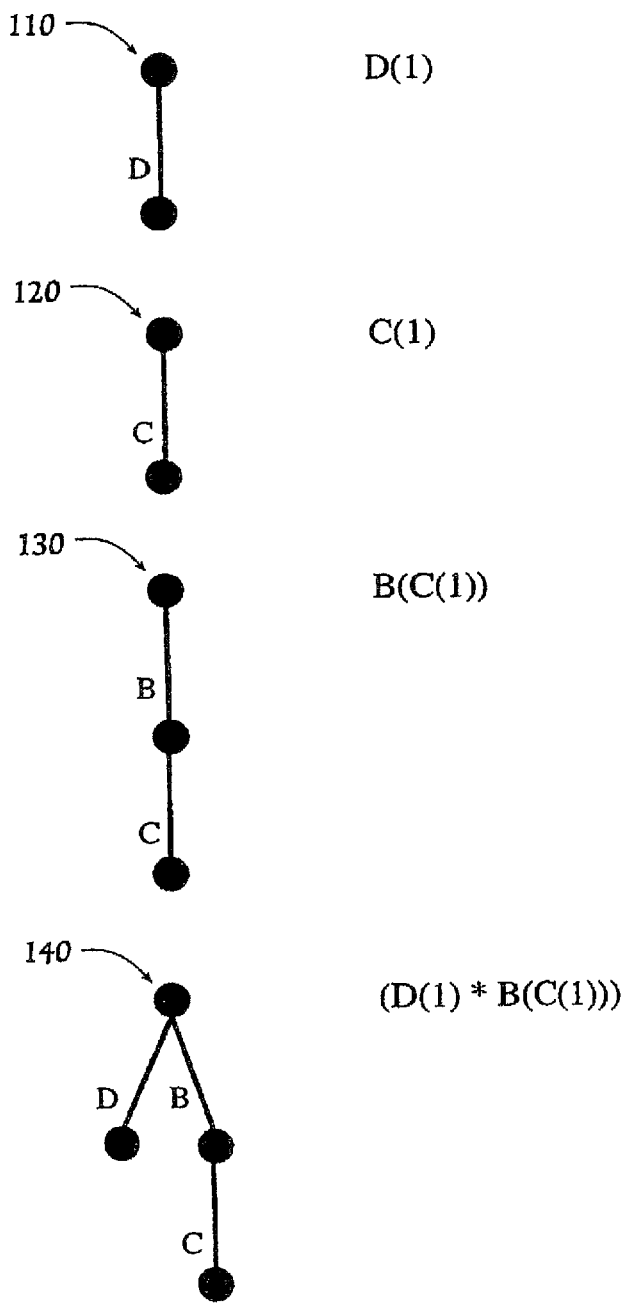
FIG. 1 is a schematic diagram of embodiments of several unordered edge-labeled trees and symbolic expressions mathematically representing the tree embodiments.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 15 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

Figure 15:
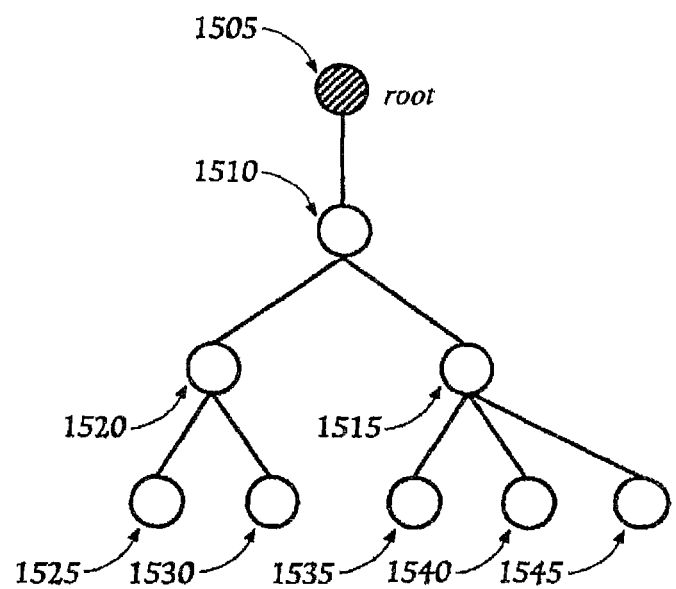
FIG. 15 is a schematic diagram of an unordered edge labeled tree.

As previously suggested, in a variety of contexts, it may be convenient and/or desirable to represent a hierarchy of data and/or other information using a structure, such as the embodiment illustrated in FIG. 15. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, US provisional patent application Ser. No. 60/543,371, titled "Manipulating Sets of Hierarchical Data," filed on Feb. 8, 2004, by J. J. LeTourneau, and assigned to the assignee of the current provisional application. This is illustrated, here, for example, in FIG. 16. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371, US provisional patent application Ser. No. 60/543,371 is provided simply as an example of listing or enumerating unordered BELTS.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 16 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp63-82, 1980, or, "Enumerating Ordered Trees Lexicographically," by M. C. Er, Computation Journal, Vol. 28, Issue 5, pp 538-542, 1985. This may be illustrated, for example in FIG. 16, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

in this context, adding a root node and an edge and labeling it binary zero is referred to as a "zero-push" operation and adding a root node and an edge and labeling it binary one is referred to as a "one-push" operation. Thus, referring again to FIG. 16, the one-push of the root tree is the tree at position three. This follows from FIG. 9 of previously referenced U.S. provisional patent application Ser. No. 60/543,371, since Q((1*2)−1)=Q(1)=3. Likewise, the tree at position five is the zero-push of the tree at position 2. Again, this follows from FIG. 9 of the previously referenced US provisional patent application, since Q((2*2)−2)=Q(2)=5.

In the embodiment just described, binary edge labeled trees use binary numerals "0" and "1." However, the claimed subject matter is not limited in scope to binary edge labels trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., as previously described and as explained in more detail hereinafter.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots. This operation is illustrated, for example, in FIG. 17.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here; for this particular embodiment, the constant value, or zero valued argument operation that returns "c" and is denoted as "c." The merger operator is denoted as "*".

Figure 4:
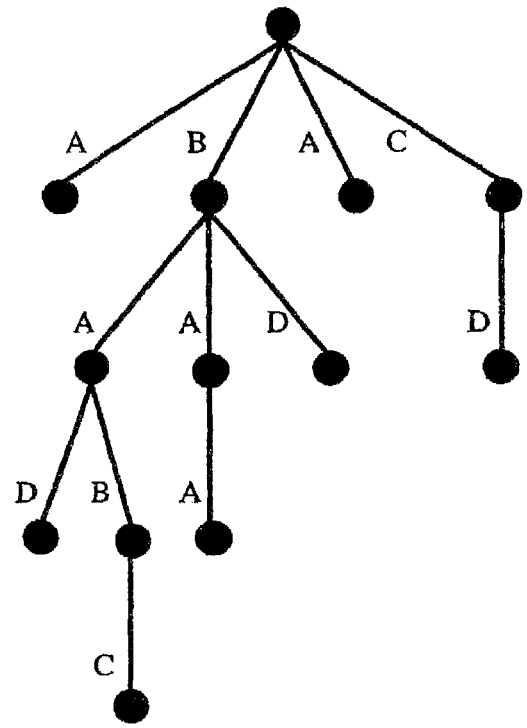
FIG. 4 is a schematic diagram illustrating an embodiment of an unordered edge-labeled tree and a symbolic expression mathematically representing the tree embodiment.

FIG. 4 is schematic diagram illustrating an embodiment of an edge labeled tree, here a 4 valued edge labeled tree. In this particular embodiment, four distinct values are employed to label the edges. Here, the labels comprising A, B, C and D, although, of course, the claimed subject matter is not limited to 4 valued edge labeled trees, to edge labeled trees, or to employing these particular edge labels. It is noted that the labels A, B, C, and D in this embodiment are similar to the labels binary 0 and binary 1 for BELTs. Below tree 400 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

To assist in understanding the relationship between the symbolic expression shown in FIG. 4 and tree 400, for this particular embodiment, FIG. 1 provides an embodiment 110 of another tree. As illustrated, tree 110 comprises an edge label D connecting two nodes. For this particular context, this embodiment may be expressed symbolically as follows: D(1). Thus, a technique to describe the embodiment of tree 110 would refer to the "push" of the natural number 1. Here, for this particular embodiment, this particular push operation comprises the "D" push of 1, resulting in D being the label of the edge connecting the two nodes. More specifically, as previously described, a single node comprises the natural numeral 1 in this particular embodiment. To perform a push operation, an edge is attached to that node and labeled. Here, applying a D push, the label provided comprises the label D.

Figure 3:
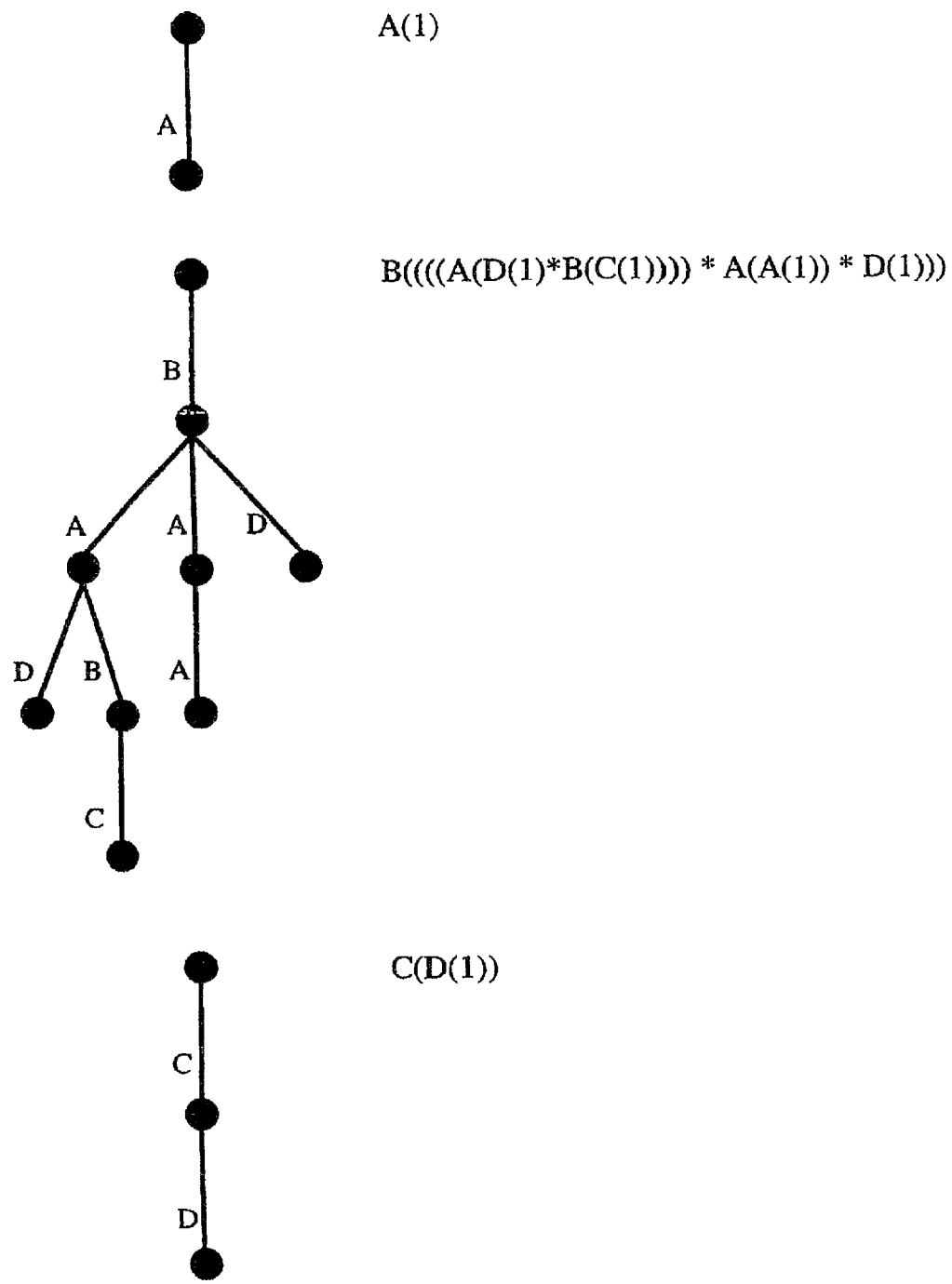
FIG. 3 is a schematic diagram of embodiments of several unordered edge-labeled trees and symbolic expressions mathematically representing the tree embodiments.

Continuing, the "C" push of "1" is illustrated as two nodes with an edge labeled C connecting the two nodes for tree embodiment 120. Applying similar reasoning provides an edge labeled tree embodiment 130 representing the following expression: B(C(1)). Likewise, for this particular embodiment, the operation of merger may be represented as "*", as previously suggested. Thus, applying a merger operation provides tree embodiment 140 at the bottom of FIG. 1 corresponding, for this particular embodiment, to the following expression: (D(1)*B(C(1))). Applying similar reasoning to FIGS. 2 and 3 and the tree embodiments shown ultimately produces tree 400 illustrated in FIG. 4, along with the corresponding symbolic expression.

As the previous discussion suggests, here A, B, C and D comprise monadic operators and the merger operation comprises a binary operation. In US provisional patent application No. 60/575,784, titled "Method and/or System for Simplifying Tree Expressions, such as for Pattern Matching," filed May 28, 2004, by J. J. LeTourneau, assigned to the assignee of the current application, monadic operators similar to those described here were designed as successor operators, using the symbol S(x). Here, these monadic operators comprise multiple successive operators.

Figure 5:
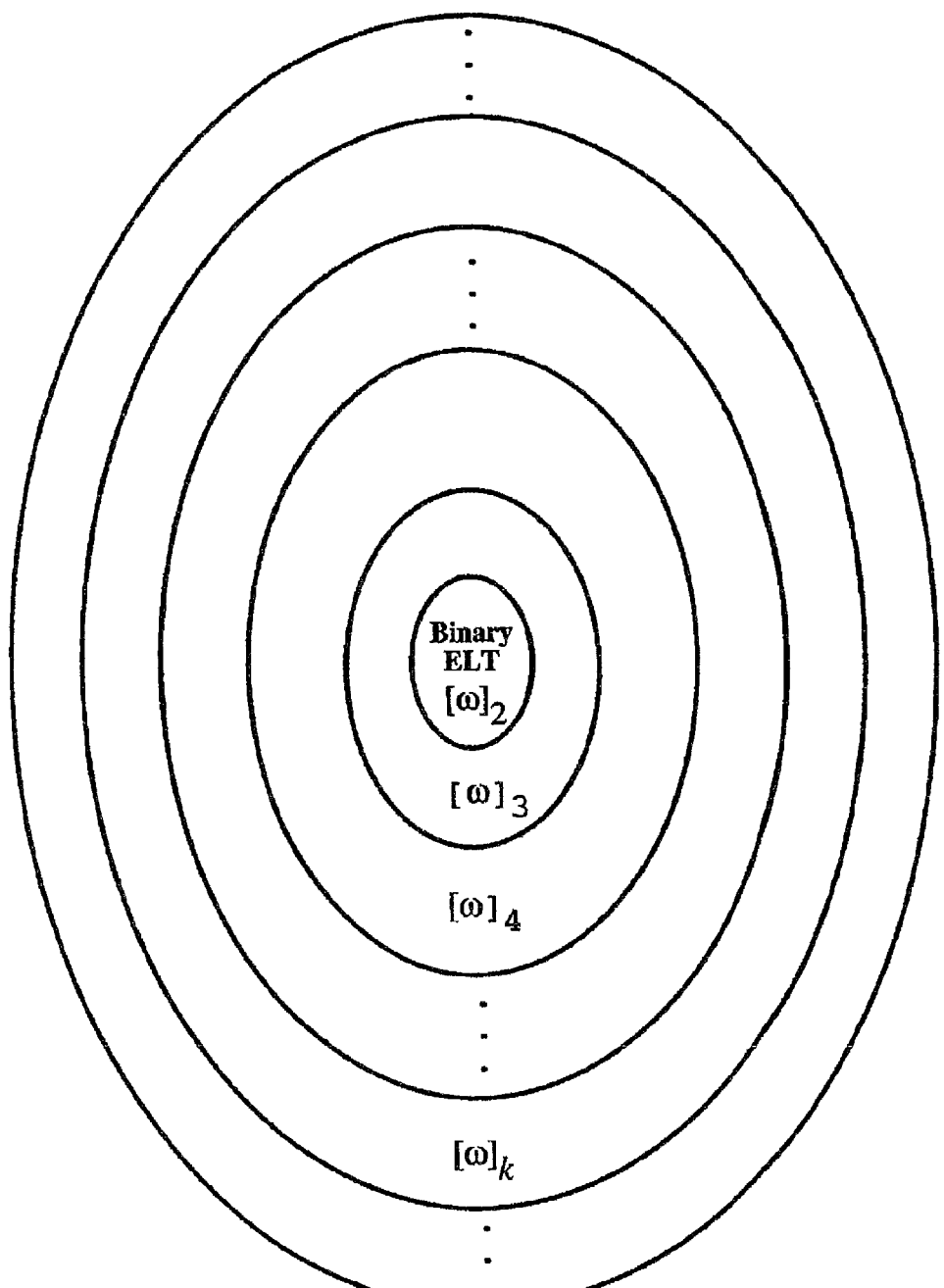
FIG. 5 is a schematic diagram illustrating all N-valued rooted, unordered, edge-labeled trees, where N is a natural numeral greater than or equal to 2.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 5, a Venn diagram 500 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may represent or store. More specifically, an identical tree may represent different data depending at least in part on whether the tree is "viewed" as, to continue with this example, a two valued edge labeled tree or a three valued edge labeled tree. Thus, in this embodiment, we refer to this as the "view" of the particular tree. For example, a two valued edge labeled tree is referred to as view 2 and a three valued edge labeled tree is referred to as view 3, although, for example, the particular tree may not contain three different values. The view in this embodiment refers to the set of distinct values from which the labels may be selected, as previously described. FIG. 5 therefore depicts the set of all edge labeled trees as the union of all such edge labeled trees in which the edge values are selected from a set having a specific number of distinct values.

Previously in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with edge labeled trees of any number of distinct edge values.

As previously suggested in aforementioned U.S. provisional patent application No. 60/575,784, a set of congruence operations on the set of tree expressions may be isomorphic to the set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

Thus, beginning with binary edge labeled trees or finite rooted unordered two valued edge labeled trees, but continuing to edge labeled trees of higher numbers of values, such as, for example, three valued edge labeled trees, four valued edge labeled trees and so forth, for this embodiment, a similar association or relationship between tree expressions and edge labeled trees may be constructed. Thus, for this embodiment, with a set of operations that satisfies a set of tree expressions an isomorphism with a set of finite routed unordered N valued edge labeled trees results in a similar one to one relationship between the equivalence classes that satisfy the tree expressions and the edge labeled trees themselves. Likewise, by demonstrating that these tree expressions are also isomorphic with natural numerals, tree manipulations are able to be constructed for edge labeled trees using natural numerals, as had similarly been done for binary edge labeled trees. Thus, as shall become more clear hereinafter, manipulating tree expressions is isomorphic to manipulating numerals for this particular embodiment.

Previously, binary edge labeled trees have been discussed. For purposes of illustration, it shall instructive to now discuss another type of edge labeled tree, such as four valued edge labeled trees. For example, FIG. 9 corresponds to finite rooted unordered four valued edge labeled trees, which were also discussed previously with respect to FIG. 4. Thus, for this example embodiment, an algebra may be constructed that is isomorphic to the natural numerals for such four valued edge labeled trees. Likewise, similar algebras may be constructed by use a similar set of tree expressions, as shown, for example, by FIGS. 7, 8, 10 and 11. The similarity of these expressions allows us to write a schema or generalized description and thereby cover all such similar algebras.

Thus, similar to an approach previously described, FIG. 9 provides a set of constants and operators here, constants 0 and 1, monadic operators A, B, C, and D and binary operator *. Thus, we designate this algebra with the signature <2,4,1> as a result. The expressions for this particular embodiment are provided in FIG. 9. The first expression, 910, denotes communitivity and the second expression, 920, denotes associativity. Likewise, the next two expressions, 930, define the relationship of the merger of the constants with any other value. The next four expressions, 940, define the monadic operators A, B, C and D.

Thus, for this embodiment, these expressions therefore define a set of edge labeled trees with particular properties. Specifically, the properties are isomorphic to the natural numerals. Thus, as shall be demonstrated further, for this embodiment, four valued edge labeled trees, for example, may be manipulated using natural numerals.

Figure 13:

At least in part because natural numerals are isomorphic to N valued trees, a way to depict this relationship for this embodiment is illustrated by FIGS. 12 and 13. Previously, a particular view for a particular edge labeled tree, for this embodiment, was discussed. In these figures, each column represents a different potential view for a set of edge labeled trees for this embodiment. Likewise, each row provides the edge labeled tree in the view corresponding to the column for the natural number on the left-hand side of FIG. 12.

For example, column one shows the trees with for two valued edge labeled trees edges, otherwise referred to as binary edge labeled trees. Thus, as previously described, no nodes corresponds to "0". Continuing, a single node corresponds to "1" or to "root". Likewise, the numerals two and three in this view turn out to be push operations. In this case, the numeral 2 is the tree corresponding to the A push of one denoted A(1). Likewise, the numeral 3 is the tree corresponding to the B push of one, denoted B(1).

For this embodiment, these relationships may also be confirmed by referring back to FIG. 7. Here, the operations A(x) and B(x) as defined in terms of the function, previously defined in connection with FIG. 6. Thus, using these expressions, to determine the push of 1 denoted A(1), as provided in FIG. 7, this is Q((2*1)−2). This provides Q(0) or the value 2, as demonstrated from FIG. 6. As similar result may be obtained for B(1). Referring to FIG. 7, this corresponds to Q((2*1)−1), or Q(1), again from FIG. 6, the value 3.

A similar relationship may be established for three valued edge labeled trees, described by the expressions provided in FIG. 8, for example. Referring again to FIGS. 12 and 13, the edge labeled trees corresponding to these expressions are depicted in the second column. It is noted that the tree structures using this notation are the same between the first column and the second column for the numerals from zero to four. However, a difference is noted between the first column and the second column at numeral 5. Thus, for view 3, the numeral 5 is the C push of 1. More particularly, again referring to FIG. 8, C(1) equals Q(3*1)−1), or Q(2). From FIG. 6, the corresponding value is 5, as previously suggested. Similarly, looking at column 3 of FIG. 12, for view 5, the D push of 1 is numeral 7.

Thus, for this embodiment, regardless of the "view" of the edge labeled trees, there is a unique one to one correspondence, here, an association embodiment, between the natural numerals and that set of edge labeled trees. This embodiment, therefore, provides the capability to manipulate and combine edge labeled trees of different view. For example, for two edge labeled trees from two different views, one of the edge labeled trees may be converted so that the two edge labeled trees are in the same view. Once in the same view, the trees may be manipulated, such as by a merger, for example. Likewise, in an alternative embodiment, both trees may be converted to numerals, the numerals may be manipulated and then the manipulated numerals may be converted back to edge labeled trees of a particular view. Likewise, the edge labeled trees may be converted to any desirable view.

It is likewise noted that for this particular embodiment one way of manipulation an edge labeled tree is to apply a push operation to the edge labeled tree. Likewise, as previously described, for this embodiment, a push operation comprises adding an edge and labeling it. Assuming for this embodiment that the labels for the edge labeled tree comprise numerals, the label for a particular view will be a numeral that is less than the view itself. For example if the view is 5 than the set of distinct values to label an edge comprises 0, 1, 2, 3 or 4. Of course, this is merely one potential embodiment and the claimed subject matter is not limited in scope in this respect. For example, as previously described, letters may be employed. Likewise, any set of values where each value is distinct may be employed and remain within the scope of the claimed subject matter.

A similar set of manipulations may be applied to node labeled trees rather than edge labeled trees. Thus, node labeled trees may be represented in different views, may be converted to the same view, may be converted to numerals, combined, and converted back to a node labeled tree of a particular view. Likewise, a push operation may be applied to a node labeled tree, as previously described for edge labeled trees.

Although the claimed subject matter is not limited in scope in this respect, one technique for implementing this approach may be to apply a table look up approach. For example, a table providing different embodiments associating different views to natural numerals may be employed. Of course, the claimed subject matter is not limited in scope in this respect. For example, instead, a table look-up may be employed for the operation Q and the expressions previously described may be applied to perform manipulations, such as those previously illustrated, for example.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

As described in prior embodiments, one technique for manipulating edge labeled trees includes converting such trees to natural numerals, performing manipulation of the natural numerals, and converting back to an edge labeled tree of a particular view. Furthermore, as described above, one technique for such conversions may include table look-up, as described above. Likewise, in another embodiment, it may be possible to convert a natural numeral directly to an edge labeled tree using a table look-up for the operation Q, previously described. For example, if it were desirable to convert the natural numeral 61 to an edge labeled tree in view 4, the numeral could be factored and the factors converted to trees. In this example, 61 is a non-composite, so, using a table look-up, Q(17) provides 61. Thus, 61 is a push of 17. Using the expressions provided on FIG. 9, for example, we may determine whether 61 is the A, B, C, or D push of 17 and so forth. Likewise, for this particular embodiment, previously an example of converting between an edge labeled tree of a particular view and a natural numeral was provided.

Embodiments of a method of manipulating tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching See, for example, "A VLSI Architecture for Object Recognition using Tree Matching" K. Sitaraman, N. Ranganathan and A. Ejnioui; Proceedings of the IEEE International Conference on Application-Specific Systems, Architectures, and Processors (ASAP'02) 2000; "Expressive and efficient pattern languages for tree-structured data" by Frank Neven and Thomas Schwentick; Proceedings of the Nineteenth ACM SIGACT-SIGMOD-SIGART Symposium on Principles of Database Systems, May 2000. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming.

Figure 14:
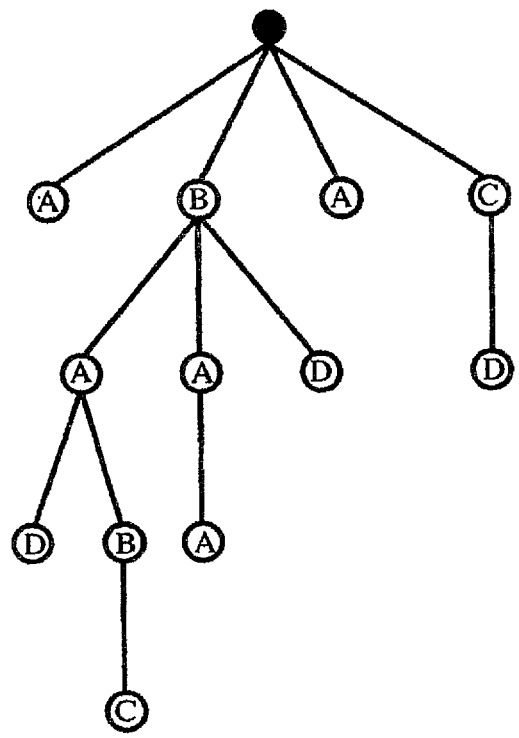
FIG. 14 is a schematic diagram of an unordered node labeled tree.

Of course, the claimed subject matter is not limited to unordered edge labeled trees. For example, as described in previously cited U.S. provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). One example of a NLT is illustrated in the diagram of FIG. 14 by tree 1400. As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. Typically, different views shall be employed, depending at least in part, for example, upon the particular type of tree. Furthermore or alternatively, as described in the previously referenced U.S. provisional patent application 60/543,371, a node labeled tree in which the nodes are labeled with natural numerals or data values may be converted to an edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of ELTs.

In another embodiment, however, a particular tree may include null types or, more particularly, some node values denoted by the empty set. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied.

Furthermore, a tree in which both the nodes and the edges are labeled may be referred to in this context as a feature tree and may be converted to an edge labeled tree and/or a node labeled tree. For example, without intending to limit the scope of the claimed subject matter, in one approach, a feature tree may be converted by converting any labeled node with its labeled outgoing edge to an ordered pair of labels for the particular node.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of manipulating an node-labeled tree (NLT) comprising:
converting a first NLT in a first view to a first NLT in a second view; and
further comprising combining said first NLT in said second view with a second NLT in said second view;
wherein said combining comprises converting said NLTs in said second view to numerals; combining said numerals; and
converting said combined numerals to an NLT.

2. The method of claim 1, and further comprising: applying a push operation to said first NLT in said second view.

3. The method of claim 1, wherein said NLT comprises an NLT in said second view.

4. The method of claim 1, wherein said NLT comprises an NLT in a view other than said second view.

5. A method of manipulating a node-labeled tree (NLT) comprising:
applying a push operation to said NLT; and
changing said NLT to a different view;
wherein said push operation comprises adding a node and labeling it.

6. The method of claim 5, wherein said push operation comprises labeling said node with a first numeral.

7. The method of claim 5, wherein said NLT has a view of M, M being a second numeral; and wherein said first numeral comprises a numeral selected from the group of numerals that are less than said second numeral.

8. An article comprising:
a storage medium having stored thereon instructions that, when executed, result in performance of a method of manipulating an node-labeled tree (NLT) as follows:
converting a first NLT in a first view to a first NLT in a second view;
wherein said instructions, when executed, further result in:
combining said first NLT in said second view with a second NLT in said second view;
wherein said instructions, when executed, further result in said combining comprising:
converting said NLTs in said second view to numerals;
combining said numerals; and
converting said combined numerals to an NLT.

9. The article of claim 8, wherein said instructions when executed, further result in: applying a push operation to said first NLT in said second view.

10. The article of claim 8, wherein said instructions, when executed, further result in said NLT comprising an NLT in said second view.

11. The article of claim 8, wherein said instructions, when executed, further result in said NLT comprising an NLT in a view other than said second view.

12. An article comprising:
a storage medium having stored thereon instructions that, when executed, result in a method of manipulating a node-labeled tree (NLT) as follows:
applying a push operation to said NLT; and
changing said NLT to a different view;
wherein said instructions, when executed, further result in said push operation comprising adding a node and labeling it.

13. The article of claim 12, wherein said instructions, when executed, further result in said push operation comprising labeling said node with a first numeral.

14. The article of claim 12, wherein said instructions, when executed, further result in said NLT having a view of M, M being a second numeral, and further result in said first numeral comprising a numeral selected from the group of numerals that are less than said second numeral.

15. An apparatus comprising:
a computing platform; said computing platform adapted to convert a first NLT in a first view to a first NLT in a second view;
wherein said computing platform is further to combine said first NLT in said second view with a second NLT in said second view:
wherein said computing platform is further to
convert said NLTs in said second view to numerals,
combine said numerals, and
convert said combined numerals to an NLT.

16. The apparatus of claim 15, wherein said computing platform is further to apply a push operation to said first NLT in said second view.

17. The apparatus of claim 15, wherein said computing platform to convert said NLT to an NLT in said second view.

18. The apparatus of claim 15, wherein said computing platform to convert said NLT to an NLT in a view other than said second view.

19. An apparatus comprising:
a computing platform;
said computing platform to apply a push operation to a NLT, and
to change said NLT to a different view;
wherein said computing platform further to apply said push operation so as to add a node and label it.

20. The apparatus of claim 19, wherein said computing platform to apply said push operation in a manner so as to label said node with a first numeral.

21. The apparatus of claim 19, wherein said computing platform to have said NLT comprise an NLT having a view of M, M being a second numeral, so that said first numeral comprises a numeral to be selected from the group of numerals that are less than said second numeral.

22. The apparatus of claim 19, wherein said computing platform to have said NLT comprise an NLT having a view of M, M being a second numeral, so that said first numeral comprises a numeral to be selected from the group of numerals that are less than said second numeral.

23. An apparatus comprising:
a computing platform;
said computing platform comprising means for converting a first NLT in a first view to a first NLT in a second view;
wherein said computing platform further comprises means for combining said first NLT in said second view with a second NLT in said second view;
wherein said computing platform further comprises
means for converting said NLTs in said second view to numerals,
means for combining said numerals, and
means for converting said combined numerals to an NLT.

24. The apparatus of claim 23, wherein said computing platform further comprises means for applying a push operation to said first NLT in said second view.

25. An apparatus comprising:
a computing platform;
said computing platform comprises
means for applying a push operation to a NLT, and
means for changing said NLT to a different view;
wherein said means for applying said push operation comprises means for adding a node and labeling it.

26. The apparatus of claim 25, wherein said computing platform to apply said push operation in a manner so as to label said node with a first numeral.

* * * * *